(12) United States Patent
Bows et al.

(10) Patent No.: US 8,277,858 B2
(45) Date of Patent: *Oct. 2, 2012

(54) PROCESS FOR MAKING A HEALTHY SNACK FOOD

(75) Inventors: John Richard Bows, Lutterworth (GB); Colin Jeffrey Burnham, Quorn (GB); David Lester Hickie, Market Harborough (GB); Greg Paul Hilliard, Birstall (GB); Michelle Louise Lock, Bury St Edmunds (GB); Brian Richard Newberry, Leicestershire (GB); Rocco Dominic Papalia, Dallas, TX (US); Joanna Louise Peart, Beckingham (GB)

(73) Assignee: Frito-Lay Trading Company GmbH, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,165

(22) Filed: Jun. 28, 2011

(65) Prior Publication Data

US 2011/0256277 A1 Oct. 20, 2011

Related U.S. Application Data

(63) Continuation of application No. 12/016,695, filed on Jan. 18, 2008, now Pat. No. 7,993,693, which is a continuation-in-part of application No. 11/686,027, filed on Mar. 14, 2007, now Pat. No. 7,867,533, which is a continuation-in-part of application No. 11/458,592, filed on Jul. 19, 2006, now Pat. No. 7,695,746.

(51) Int. Cl.
*A23L 1/01* (2006.01)
(52) U.S. Cl. ........ 426/233; 426/242; 426/243; 426/637; 426/438; 426/465; 426/523; 426/808

(58) Field of Classification Search .......... 426/231–233, 426/241–243, 637, 438, 465, 466, 520, 523, 426/808
See application file for complete search history.

(56) References Cited

U.S. PATENT DOCUMENTS

| | | | | |
|---|---|---|---|---|
| 3,365,301 A | * | 1/1968 | Lipoma et al. | 426/242 |
| 3,627,535 A | | 12/1971 | Davidson et al. | |
| 4,537,786 A | | 8/1985 | Bernard | |
| 4,707,370 A | | 11/1987 | Kakis | |
| 4,721,625 A | * | 1/1988 | Lee et al. | 426/438 |
| 4,756,916 A | * | 7/1988 | Dreher et al. | 426/302 |

(Continued)

FOREIGN PATENT DOCUMENTS

CA 911802 10/1972

(Continued)

*Primary Examiner* — Drew E Becker
(74) *Attorney, Agent, or Firm* — Shaukat A. Karjeker; Colin P. Cahoon; Carstens & Cahoon, LLP

(57) ABSTRACT

The present invention is directed towards a method for making a healthy snack food having an appearance and taste similar to conventional fried snack products without the use of an oil-flying process. The method of the present invention includes the steps of providing food slices from a starch-based food or dough. The food slices can be blanched and a controlled amount of oil can be added to enhance final organoleptical properties. The food slices are then rapidly dehydrated to a much lower moisture content in a primary drying step that simulates conventional frying dehydration rates. A food snack, such as a corn or potato-based snack, produced by this method is a low-fat, ready-to-eat snack having the conventional texture and taste associated with fried snack products.

15 Claims, 8 Drawing Sheets

U.S. PATENT DOCUMENTS

| | | | | |
|---|---|---|---|---|
| 4,933,199 | A | * | 6/1990 | Neel et al. .................... 426/438 |
| 5,049,711 | A | | 9/1991 | August |
| 5,180,601 | A | * | 1/1993 | Gaon et al. .................... 426/242 |
| 5,470,600 | A | * | 11/1995 | Petelle et al. ................. 426/237 |
| 5,643,626 | A | | 7/1997 | Henson et al. |
| 5,676,989 | A | * | 10/1997 | Durance et al. .............. 426/242 |
| 7,307,243 | B2 | | 12/2007 | Farkas et al. |
| 7,993,693 | B2 | * | 8/2011 | Bows et al. ................... 426/233 |

FOREIGN PATENT DOCUMENTS

| | | |
|---|---|---|
| GB | 2225205 | 5/1990 |
| GB | 2288718 | 11/1995 |
| RU | 2238652 C2 | 10/2004 |
| WO | 03/024242 A1 | 3/2003 |

\* cited by examiner

PROCESS FOR MAKING A HEALTHY SNACK FOOD

CROSS REFERENCE TO RELATED APPLICATION

This application is a continuation patent application of prior U.S. Ser. No. 12/016,695 filed Jan. 18, 2008 now U.S. Pat. No. 7,993,693, which is a continuation-in-part of prior U.S. Ser. No. 11/686,027 filed Mar. 14, 2007 now U.S. Pat. No. 7,867,533 issued on Jan. 11, 2011, which is a continuation-in-part of prior U.S. Ser. No. 11/458,592 filed Jul. 19, 2006 now U.S. Pat. No. 7,695,746 issued on Apr. 13, 2010, and which claims priority to International Serial No. PCT/US2007/073820 filed Jul. 18, 2007, the technical disclosures of which are hereby incorporated by reference in their entirety.

BACKGROUND OF THE INVENTION

1. Technical Field

The present invention relates to an improved method for producing shelf-stable snack foods and especially low oil snack foods. More specifically, the present invention relates to a method whereby a unique combination of unit operations are used to produce a low-fat potato crisp having organoleptical properties similar to those of traditional fried potato crisps.

2. Description of Related Art

Conventional potato crisp products are prepared by the basic steps of slicing peeled, raw potatoes, water washing the slices to remove surface starch, and frying the potato slices in hot oil until a moisture content of about 1-2% by weight is achieved. The fried slices can then be salted or seasoned and packaged.

Raw potato slices normally have a moisture content from about 75% to about 85% by weight depending on the type of potato and the environmental growing conditions. When potato slices are fried in hot oil, the moisture present boils. This results in burst cell walls and the formation of holes and voids which allow for oil absorption into the potato slices yielding oil contents ranging from about 30% to about 45% by weight.

The oil content of potato crisps is important for many reasons. Most important is its contribution to the overall organoleptic desirability of potato crisps, however, from the standpoint of good nutrition, it is desirable to maintain a low level of oil or fat in potato crisps. Many health conscious consumers desire a low fat alternative to the traditional fried crisp having minimal taste differences from the fried product. Further, a high oil content renders the crisps greasy or oily and hence less desirable to the consumer. Numerous attempts have been made in the prior art to reduce the oil content in potato crisps. Many attempts involve thermally processing the potato slices in an oven or a microwave to avoid the addition of oil to the potato crisp.

For example, U.S. Pat. No. 5,292,540 claims a process for preparing potato crisps by first pre-baking the potato slices at a temperature of between about 121° C. to about 260° C. (250° F. to 500° F.) to remove about 50% to about 80% of the moisture in the slice prior to microwave heating the potato slices.

Similarly, U.S. Pat. Nos. 5,180,601; 5,202,139; and 5,298,707 all relate to a method and apparatus for producing fat-free snack crisps. For example, U.S. Pat. No. 5,298,707 discloses a first intensive microwave pre-baking step that reduces the moisture content in the potato to between about 25% and about 30% by weight. The '707 patent employs a special intermittent microwave field provided by a meandering wave guide and a special conveyor belt to reduce the problems of hard surface and texture. However, according to U.S. Pat. No. 5,676,989, the approach disclosed in U.S. Pat. No. 5,298,707, still produces an undesirable, relatively dense, hard crisp. Similarly, nearly all of the prior art processes result in a low fat snack food having organoleptical properties far less desirable than the fried potato crisp counterpart. Thus, none of the prior art solutions have succeeded in mimicking the taste and texture of fried potato crisps.

Consequently, a need exists to provide an economical method for making reduced oil potato crisps having desirable organoleptical properties similar to traditional potato crisps.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of the illustrative embodiments when read in conjunction with the accompanying drawings wherein:

DETAILED DESCRIPTION

Figure 1:
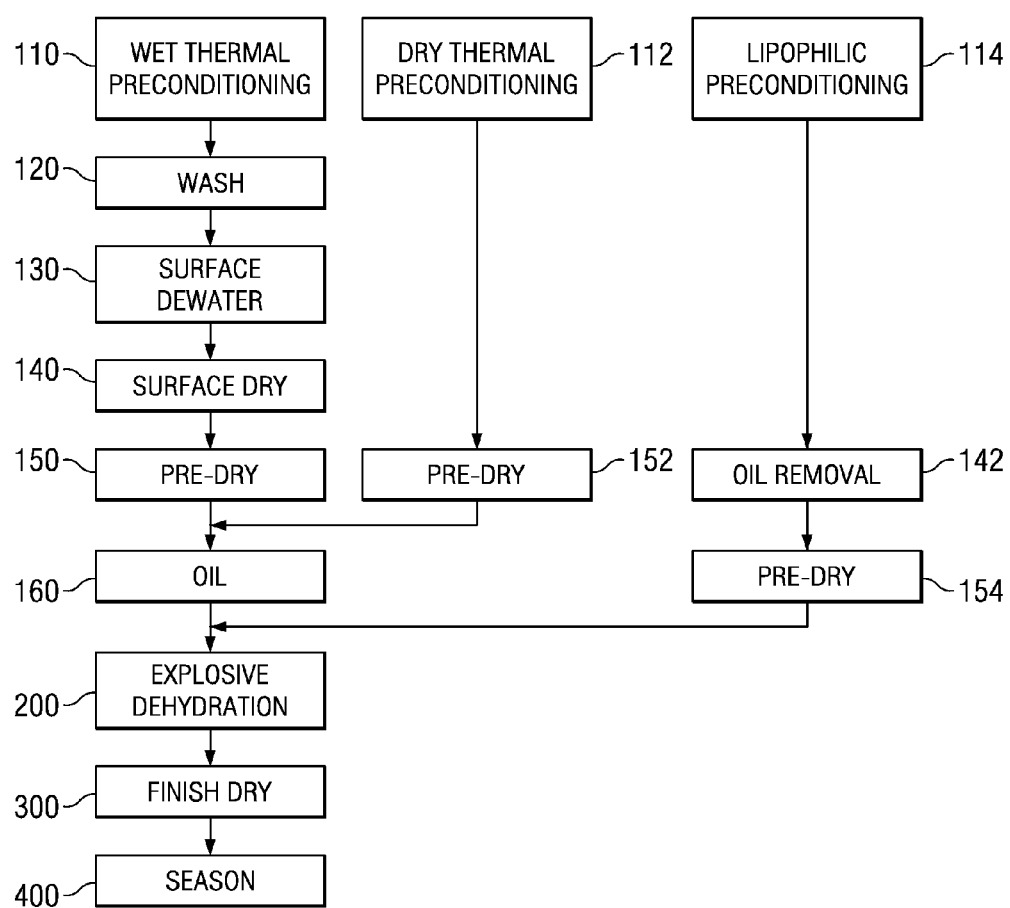
FIG. 1 is a flow chart representation depicting numerous embodiments of the present invention.

FIG. 1 is a flow chart representation depicting the preparation steps of raw food-based slices in accordance with numerous embodiments of the present invention. The preferred sources of food substrates or slices are cereal grains (e.g., corn, waxy corn, oats, wheat, sorghum, rice, oats, millet, rye, barley, and waxy rice), pulses (e.g. kidney beans, pinto beans, lentils, chickpea), tubers (i.e., potato, Jerusalem artichoke, yam), fruit, vegetables, and roots (i.e., tapioca, yucca, tarot, sweet potato, beet, carrot, arrowroot, cassaya, parsnip). In one embodiment of the present invention, potatoes of the chipping variety can be used. Potatoes of the chipping variety that can be used include, but are not limited to Saturna, Lady Rosetta, Lady Claire, Hermes, Maris Piper, Erntestolz, Agria, Atlantic, Monona, Norchip, Snowden, Kennebec, Oneida, and Tobique. Non-chipping and salad potato varieties can also be used including, but not limited to Marfona, King Edward, Yukon Gold, Desiree, Karlena, Charlotte, Nicola, Maris Peer and Estima. Similarly, French fry varieties such as Russet Burbank, and Bintje can be used. It should be noted that while chipping potatoes typically used for making potato crisps have relatively low levels of reducing sugars, and are not typically used to make French fries or baked potatoes, any potato can be used in accordance with the present invention and the present invention is not limited by physiological or biological make up of the potato.

Although potato slices are used to illustrate this invention, one skilled in the art armed with the knowledge of this disclosure will recognize that the resultant processing times and temperatures disclosed below may need to be adjusted to compensate for the use of a different starting material. For example, while the present invention is suitable for the preparation of low-fat potato crisps made from potatoes, the present invention is also applicable to a wide variety of food substrates which can be cut or otherwise formed into flat, generally thin slice-shaped portions. The present invention can be used to prepare crisps from raw vegetables, such as potatoes, and the like that have been cut into slices or, alternatively, doughs comprising masa, other raw materials reduced to a formable state, re-hydrated dry ingredients including potato flakes, or other food substrates may be ground into a dough or paste, mixed with other ingredients and additives and then shaped into configurations such as flat slice or cracker shapes for preparation into a snack. Consequently, as used herein, the term "food slice" encompasses pre-forms made from a dough.

Similarly, while the present invention is suitable for the preparation of low-fat potato crisps made from sliced potatoes, the resultant processing times and temperatures disclosed below may need to be adjusted to compensate for the use of a different starting material and shape. For example, potatoes can be cut into slices having one or more flat sides or the potatoes can be sliced with one or both ridged sides. One advantage of ridged sliced potatoes is that the slices are less likely to stick together because of the reduced surface tension, which results from a reduced surface area available for contact between the slices. Consequently, less intensive surface drying may be required with a ridged slice. In addition, when a continuously agitated drying system such as a rotating drum is used, the profile of a ridged slice can impart greater resistance to mechanical folding or clumping actions thus producing a higher proportion of singulated whole slices and a lower proportion of excessively folded slices. In one embodiment, the potatoes can be cut into wedges or French fry-like sticks of suitable size. In one embodiment, French-fry like sticks have cross-sectional widths of about 5 to about 6 millimeters. In another embodiment, potatoes are cut into slabs of, for example, about 1 to about 3 mm depth, about 50 to about 100 mm length and about 20 to about 50 mm width or other suitable size known in the art. Because the French-fry like sticks, wedges, and slabs have different geometries, surface area to volume ratios, etc. than slices, the processing times and energies disclosed in each unit operation below may require adjustments. Similarly, if the starting material is further reduced in size (for example by comminution through grating, shredding, ricing, milling or grinding) and then reformed to a dough, pellet, cluster, laminated snack or snack cake comprising the original material and, optionally, a medley of additional ingredients, the resulting food slice can be processed to a desirable snack product under appropriate conditions using the knowledge of this disclosure. Methods for preparing various pre-forms are known in the prior art as exemplified by U.S. Patent Application Publication No. US 2005/0202142, which discloses a method for making a clustered snack product or U.S. Patent Application Publication No. 2002/0142085, which discloses a method for making a potato mash that is suitable for the production of food products, including potato snacks.

In one embodiment, Saturna or other suitable potatoes are washed and peeled prior to the slicing step. Although peeling is optional, the peel can contribute to a dominant earthy flavor when the finished food product has low oil content. In one embodiment, the potatoes are sliced to a thickness of between about 1.0 millimeters to about 2.5 millimeters (0.040 inches and about 0.1 inches) in a slicer to provide a plurality of potato slices. Other suitable slice thicknesses may be selected. The potatoes can be dry sliced, sliced in the presence of water, sliced in oil which may provide a desired oil addition to the slice and/or accomplish a preconditioning step which achieves several benefits, including thermal treatment within the approximate temperature range from about 60° C. to about 99.9° C., which has been shown to deactivate enzymes and gelatinize starch with organoleptic benefits. Such a process is referred to by Applicants as "thermal preconditioning". If thermal preconditioning is done in such a way that potato lipids are protected against oxidation and hydrolysis, which has been shown to improve the long term stability or shelf life of the product flavour, such process unit operations that achieve said thermal treatment with protection of lipids is referred to by Applicants as "Lipophilic preconditioning" steps. In one embodiment, potato slices are washed in a flume and dewatering belt to remove surface starch, scraps and excess oil, if applied, from the potato slices.

The potato slices are then thermally preconditioned, or, if preferred, lipophilically preconditioned. If a dough is used, the thermal preconditioning step may have already occurred at a prior processing stage and additional thermal preconditioning may not be necessary. If the thermal preconditioning occurred in a prior processing stage, then the thermal preconditioning step should be construed to have occurred within the meaning of claimed limitations of the present invention. Further, in a dough-based embodiment, any thermal preconditioning step is optional. Thermal preconditioning is only a requirement where the product can benefit from pre-cooking the native starch or de-activating enzymes. Lipophilic preconditioning is preferred where benefit can be gained from thermal treatment in absence of oxygen, which will minimize lipid oxidation, and minimal externally-introduced water to minimize hydrolysis. Thermal preconditioning is not necessary for leaching sugars or where native starch is already hydrated or gelatinized or when enzymes have been deactivated in a prior processing step. For example, in one embodiment, steam cooked vegetables such as carrots can be used as the food slice and no further thermal preconditioning step is necessary. The purpose of the thermal preconditioning step is to deactivate enzymes such as peroxidase, polyphenol oxidase, and lipoxygenase that can cause undesirable "earthy green" flavors. In one embodiment, thermal preconditioning can also be used to gelatinize the native starch of the food slice in order to minimize raw flavours.

Thermal preconditioning can be accomplished in a number of ways, including a wet thermal preconditioning step 110, a dry thermal preconditioning step 112 or an oil thermal preconditioning step (lipophilic preconditioning) 114. Wet thermal preconditioning, which involves using water or steam to raise the temperature of the food slice to the desired range to carry out enzyme deactivation and starch gelatinization, suffers a disadvantage in that native lipids in the food slice, which are often contributors to organoleptic properties, can be oxidized or otherwise chemically changed due to the combination of temperature, time and presence of water and oxygen and rate of deactivation of lipid enzymes, which reduces the consumer appeal of the final product flavour. The thermal preconditioning medium, temperature and dwell time can vary based upon the shape and cross section of the food slice and are preferably controlled such that the potato slices are sufficiently cooked to deliver a clean base flavor, absent of any raw, green taste.

In one embodiment, the slices are dry thermally preconditioned 112 at a slice temperature of about 90° C. to about 95° C. for about 10 to about 120 seconds and more preferably for about 90 to about 100 seconds by a rotary or conveyor infrared dryer or other suitable heating medium. Dry thermal preconditioning is advantageous for starchy food slices since it avoids the introduction of excess moisture that may allow starch cells to rupture or disintegrate, in turn releasing gelatinized starch and creating difficulty due to adhesion of the food slice to other slices or surfaces during processing. In one embodiment, dry thermal preconditioning 112 is performed through conduction, for example using heated conductive rollers or a heated flat ceramic or metal pan, conveyor belt or plate that may contact both sides of the slice simultaneously for 10 seconds to 90 seconds depending on the processing temperature in use, which will typically be about 60° C. to 160° C. For thin food slices temperatures of 90° C. to 120° C. are preferred for 30 to 90 seconds. Contacting both sides of the slice simultaneously ensures there is no lift or curl of the food slice away from the conductive surface, which can reduce the effectiveness of blanching. Optionally, the plate may comprise a textured metal surface, for example as supplied by RIMEX, or a non stick coating to improve slice handling. At higher temperatures surfaces may be perforated to ease escape of steam.

In an alternative embodiment dry thermal preconditioning is achieved with microwaves, Radio Frequency or infra-red. Dry thermal preconditioning 112 of other shapes such as French fry like sticks can require thermal preconditioning of two to four minutes and selection of appropriate infra-red wavelength for adequate penetration of the food slice. After dry thermal preconditioning 112, the food slices can optionally be pre-dried 152 in a forced air oven to remove some initial water to improve overall process efficiency and/or improve their surface characteristics in order to improve handling and processability. The dry thermally preconditioned 112 slices can then be routed to the oiling step 160, discussed below.

In one embodiment, the food slices are lipophilically preconditioned 114 by placing the slices into a warm oil flume, a batch kettle or a continuous oil dip. ABCO, LYCO, PPM and Heat and Control are examples of manufacturers of suitable commercial equipment, which is commonly used in the food industry for blanching in either water or oil and can be adapted in either rotary or linear form to achieve lipophilic preconditioning described here. A linear water blancher available from Heat and Control that uses a caterpillar conveyor with vanes to move slices through the bath in compartments can be adapted to a suitable oil bath and will preferably use mild agitation only. A HEATWAVE frying system available from Heat and Control of Hayward, Calif. USA can also be used. In one embodiment, slices are spread evenly distributed across the exit conveyor of the thermal preconditioning step or lipophilic preconditioning step for presentation to the next unit operation.

In the prior art, oil blanching is a term used to describe many processes. These processes include thermal pre-conditioning as described above using oil, water or other suitable media. However blanching in prior art is typically done at relative high temperatures, such as 150° C. and above. For example, U.S. Pat. No. 5,204,133 titled "Process for Preparing Sliced Potato Products" and issued on Apr. 20, 1993, discloses an oil blanching temperature of about 360° F., or 182° C., at Column 4, Line 55. Likewise, U.S. Pat. No. 4,608, 262 titled "Method of Making Frozen Potato Patties and the Products Formed Thereby" and issued on Aug. 26, 1986, discloses oil blanching temperatures ranging from about 325° F. to about 380° F., and preferably about 350° F. to 370° F., at Column 3, Lines 7-8. However the relatively high temperatures in prior art also cause a problem in that food slices will also undergo some degree of dehydration which allows ingress of significant levels of oil into the slice structure. This is a particular problem when producing a low oil food product, since oil that has been absorbed into the structure is more difficult to remove at a later stage. One additional problem of the higher temperature process, in the context of a raw vegetable slice, is the loss of moisture from cell walls which causes the slice to lose turgidity and structure, and therefore become prone to damage during subsequent processing. For the purpose of this invention the method of lipophilic preconditioning is considered to be a time based heat treatment where the heat and time combination is sufficient to inactivate enzymes and to gelatinize ('cook') native starch with native water content but is below the evaporation temperature of water in the blanching vessel. Therefore, at sea level, standard atmospheric pressure the maximum oil temperature used for Applicants' lipophilic preconditioning step is about 99.9° C. In one embodiment, the food slices are raised to a temperature that enables the native starch to be hydrated (fully or partially gelatinized) by the inherent moisture of the potato slice in the absence of substantial quantities of external water or oxygen. A final slice temperature of about 60° C. to about 99.9° C. during a lipophilic preconditioning step of about 30 to about 600 seconds in duration, or more preferably, for a thin food slice, a final slice temperature of about 75° C. to about 99° C. for treatment lasting between about 45 seconds and about 180 seconds is sufficient for optimal flavor benefit, slice rigidity and subsequent handling, and is preferred by Applicants for the processes described herein. Longer durations than 600 seconds will still achieve the technical effects described but will increasingly become less commercially attractive due to the increased size of manufacturing equipment. More preferable is a lipophilic preconditioning step oil temperature of about 75° C. to about 99° C. with a duration of about 60 seconds to about 120 seconds. The most preferred ranges for Applicants' lipophilic preconditioning step are an oil temperature of about 85° C. to about 95° C. for a duration of about 60 seconds to about 100 seconds.

An advantage of the lipophilic preconditioning step is to preserve minor constituents of the food slice that make important contributions to flavor and color that may be solubilised or otherwise impaired if using conventional water or steam blanching. In addition, avoiding removal of these ingredients and other potato constituents, by using a non-leaching process such as lipophilic preconditioning, is advantageous in preserving maximum production yield. Although no frying is involved, the technique of lipophilic preconditioning as disclosed here brings the flavor of the finished chip much closer to its fried counterpart when compared to other blanching methods that may be used to produce products with similar oil contents. In this way, the lipophilic preconditioning 114 method using the unique time and temperature disclosed here overcomes a significant hurdle to the taste acceptability of reduced oil, non-fried food slices disclosed in the prior art, which either suffer from raw and green flavour notes due to the absence of any blanching method or suffer a foreshortened shelf life due to the degradation of flavour caused by conventional blanching methods or oxidation after processing. The Applicants' lipophilic preconditioning step has been shown to protect the sensitive, polyunsaturated lipids that are naturally present in the substrate materials of the food slice from degradation. Degradation results in undesirable flavors, particularly those derived through oxidation pathways, in the finished chip and can arise from oxidative or hydrolytic stress caused by the processing conditions or arise in the finished, reduced oil food slice during storage in a pack due to oxidation of, for example, but not limited to, potato lipids, rice lipids or soy lipids. Therefore, an advantage of the lipophilic preconditioning step is to extend the shelf life of packaged potato chips, from as little as two to four weeks when using conventional blanching methods for example water or steam, to the norms associated with the packaged snacks category in FMCG markets.

Without being bound by theory, the inventors believe the lipophilic preconditioning step as described in the above embodiments is a low stress processing method that minimizes exposure to enzymatic, hydrolytic or oxidative reactions of lipids in the food slice and subsequently provides a protective coating at the cellular level of the food slice during processing and possibly also once in its finished chip form. Therefore, an advantage of the lipophilic preconditioning step is to control the contribution of flavours derived from the food slice substrate and the food slice oil to the final chip so that each component contributes an optimum balance of flavours to the final chip. When the food slice substrate is potato, the lipophilic preconditioning step suppresses undesirable flavour reactions, in particular potato lipid oxidation, and promotes desirable flavour reactions. The relative contribution of flavour compound classes including, but not limited to, aldehydes, strecker aldehydes, ketones, alcohols, alkyfuran or pyrazines can be positively influenced with the processing method disclosed. Those skilled in the art will understand that the use of lipophilic preconditioning, to influence pyrazines can also be applied to influence and minimize similar chemical reaction pathways, for example acrylamide formation, for which pyrazine is sometimes used as a chemical marker. The ability to control formation of acrylamide is a surprising result given that reducing sugars are not leached from the potato, and sugars are the principal reagent forming acrylamide. Without being limited by theory, one possible explanation for this is that the lipophilic preconditioning step (and specifically conditions described in the above embodiments) influences the availability of reactants in the food slice base to participate in reactions commonly associated with food cooking and drying and in particular potato food chemistry. For example, swelling of the potato starch may cause immobilization or partial immobilization of the cell wall constituents in a potato slice, and particularly reducing sugars such as glucose, which may be driven to the slice surface, cell walls or other interstitial locations from where it is sterically difficult to participate in Maillard reactions, in particular with Asparagine.

When potato slices are lipophilically preconditioned the loss of water-soluble constituents such as sugars, which are essential to the desirable final colour and flavour of the potato chip, are avoided. Equally, the loss of crispness in texture that is typically associated with potato chips that have been blanched with hot water is avoided. Therefore, the potato slices are still suitable for drying in a conventional continuous or batch fryer to make a potato chip to the standard expected by consumers of high quality brands such as Lay's™ potato chips today.

Those skilled in the art will understand that similar starch swelling and hindrance of reducing sugar availability can be achieved via any of the thermal preconditioning techniques described herein. However, the preferred embodiment that achieves low acrylamide formation whilst also protecting the desirable flavour compound classes defined herein, is any non-leaching thermal preconditioning technique, where the term leaching relates to the loss of sugars or other flavour compounds from the potato to the preconditioning medium. Suitable non-leaching thermal preconditioning techniques that reduce acrylamide formation but do not compromise flavour include, but are not limited to, any method that swells starch without leaching flavour compound classes described herein, dry thermal preconditioning as described herein, using any suitable source of heat energy, non-leaching media which are thermally stable within the temperature conditions required such as oils, fats, synthetic oils, saturated aqueous solutions or marinades as described in this application, or any food-grade, non-leaching material which is capable of being itself heated and enveloping the slice so as to induce heat transfer to the slice whilst being incapable of itself carrying or solubilising flavour compounds. The flavour benefit is clearly noticeable to consumers of potato chips when steam blanching, the best thermal preconditioning method known in the art for manufacturing low oil potato chips, is compared to other thermal preconditioning methods, particularly lipophilic preconditioning. In multiple tests, consumers who ate salted potato chips treated with steam prior to explosive drying scored the product 6.2 for overall liking on a 9 point scale, whereas, salted potato chips prepared by lipophilic preconditioning scored 6.8 When consumers compared potato chips prepared by these two methods, 66% preferred the chips that were prepared by lipophilic preconditioning. This statistically significant preference is attributable to several organoleptic qualities in particular the flavour difference between the products as evidenced by the significantly different liking scores found in favour of chips prepared using a lipophilic preconditioning step versus a steam preconditioning step for overall flavour (6.9:6.2) and aftertaste (6.4:5.9) using the 9 point scale. Therefore, an important benefit of the lipophilic preconditioning step is to enable a non-fried potato chip with an oil content less than about 20% to be optimized for consumer appeal. A potato chip made with half the fat of regular potato chips using the applicants' disclosure will be perceived by consumers to have an overall acceptability that is not significantly different to Lays, the best selling potato chip brand worldwide.

The lipophilic preconditioning step is suitable as a pre-treatment step to non-fried and fried snack food production. The lipophilic preconditioning step can be used to process whole, cubed or other diced forms of vegetable or potato to make a pre-form dough for this invention. The dough can then be formed and explosively dried in a microwave oven as disclosed in this invention. Further, the lipophilic preconditioning step can replace conventional blanching methods in the production of frozen potato products or potato flakes and granules and other potato products that are subject to lipid oxidation. The lipophilic preconditioning step can substitute both or either of the pre-cooking (typically around 70 to 75 Celsius) and cooking (typically at or approaching 100 Celsius) steps commonly performed using steam in flakes, granules, french fries and croquettes production today.

Applicants' lipophilic preconditioning step also acts as an oil addition step to the raw slice. Using one of the subsequent oil removal methods disclosed in this invention the ingress of oil into the food slice during dehydration can be controlled to a specified level. A further advantage of lipophilic preconditioning is to avoid presenting excess water to the starch in the food slice and therefore to minimize gelatinization of surface starch, which can assist with subsequent handling. Even though temperatures are maintained below water evaporation temperatures, lipophilic preconditioning can result in some moisture loss from the food slices. This is thought to be due to free water in or on the food slice being displaced into the oil. The amount of water displaced will in part be dependant on the amount of free water on the food slice before the lipophilic preconditioning step. Therefore, it is preferable to remove as much free water as possible before a food slice enters the lipophilic preconditioning step 114.

To achieve this, surface drying techniques disclosed later in this invention can be applied before the lipophilic preconditioning step. Since the lipophilic preconditioning temperature is lower than the boiling point of water, water may become suspended or emulsified in the oil. In this situation the processor may elect to use a settling sump or similar device in order to drain the water or divide oil which is circulating so that a portion is routed through an evaporation chamber heated at >100° C.

In one embodiment, the slices are treated by flash frying for a suitable time and temperature to deactivate enzymes in place of a lipophilic preconditioning step. Flash frying is considered to be a time based heat treatment where the heat and time combination is sufficient to inactivate enzymes and evaporate a portion of water in the flash frying vessel. Therefore the minimum flash frying temperature is that at which the water inside the potato cell matrix boils, commonly observed to be 100° C. at standard atmospheric pressure. Similar equipment to that used for lipophilic preconditioning step can be used for flash frying. For example, in one embodiment, potato slices are flashed fried for about 7 seconds to about 10 seconds in oil at about 180° C. Alternatively, the potato slices can be flashed fried for about 15 to about 20 seconds in oil having a temperature of about 150° C. to about 160° C. These conditions may be preferred for thicker food slices to ensure adequate heat transfer and slice rigidity for subsequent handling.

More moisture is lost if the lipophilic preconditioning step 114 is replaced by flash frying which in turn provides the opportunity for oil to be absorbed into the slice. For example, in one embodiment, flash fried slices comprise a moisture content of about 50% to about 55% by weight. Consequently, in one embodiment, about 30% to about 40% of the starting weight of moisture in a potato can be lost when the lipophilic preconditioning step 114 is replaced by flash frying, which can improve overall process efficiencies. One benefit of flash frying is to simultaneously deactivate enzymes, add a limited amount of oil to the food slice and pre-dry the substrate in one step. Finished chip oil content can be controlled using one of the subsequent oil removal methods disclosed in this invention.

Any oil or fat is suitable for the process disclosed including vegetable oil, animal fats or synthetic oils, for example coconut oil, corn oil, cottonseed oil, palm oil, palm olein, safflower oil, high oleic safflower oil, palm stearin, soybean oil, olive oil, rice bran oil, sunflower oil, mid or high oleic sunflower oil, rape seed oil, lard, tallow, Olestra™, sucrose polyesters, medium chain fatty acids or a blend of different oils. The choice of oil can be used to influence the final flavor and mouth feel of the finished crisp as well as the nutrition profile. Selecting an indigestible oil (e.g. Olestra™) enables the manufacture of snacks with a lower calorific density than conventional snack foods, if combined with a food slice of suitable composition.

The slice can then undergo oil removal 142 to the desired level. Oil removal is assisted by the wet and raw to partially cooked nature of the food slice because the oil is principally on the slice surface and has not been substantially absorbed into the slice interior. The slice is preferably de-oiled directly from the lipophilic preconditioning step while hot but can be cooled to a temperature at or below ambient before oil is removed. Oil removal can be performed using wet methods. In one embodiment the oil removal step 142 can occur in a linear steam blancher commercially available from ABCO, where the food slices are transported through a chamber filled with atmospheric pressure steam by a series of steam manifolds above and below the belt. A 20 to 60 second exposure time using this method is sufficient to reduce oil on a thin food slice to less than 18% oil, less than half the fried counterpart, and typically to around 12% oil in the final chip. Alternatively, the slices can be transported through a perforated rotating drum made from metal or a suitable heat resistant polymer (e.g. polypropylene or PTFE). Steam can be introduced via a manifold inserted along the center of the rotating drum, alternatively the drum can be mounted inside a chamber with circulating steam. Sparging the tumbling slices with steam at 0.7 bar for 20 seconds is sufficient to fully de-oil to 3% or less in the final chip. Mounting an external steam or air knife angled toward the outer circumference of the drum will assist this process step by dislodging any slices that stick to the internal circumference of the drum.

In one embodiment, the oil removal step 142 can occur by washing in a hot water bath (typically about 50° C. to about 65° C.) or ambient cold water bath (typically about 10° C. to about 25° C.) either of which optionally may contain marinade ingredients, such as sodium chloride, calcium chloride or pH modifying substances. This oil removal method removes almost all available surface oil to so that a thin potato slice, which is subsequently dried, will typically contain less than or equal to 3% oil. A model No. PSSW-MCB speed washer available from Heat and Control is one example of a suitable water bath. Similar results are achieved if the water bath is combined with or replaced by a series of pressurized water jets, knives or air atomized water nozzles mounted above and below the slices, which are transported on an open weave conveyor that may optionally use an upper hold down conveyor. The advantage of water jets is to provide more control over de-oiling through variables such as water flow rate, water pressure, angle of water knife and exposure time. Water jets are an efficient method of oil removal to low oil contents. Levels less than 3% oil are feasible and a range of 5% to 10% can be achieved in the finished chip with acceptable process control. In one preferred embodiment, a water knife positioned transversely above and below the food slice product transport belt can be used to wash oil from the surfaces of the slices. After the water knife, a high velocity air knife system, for example the Heat and Control Air Sweep commonly used for de-watering during potato chip processing, is preferably used to remove any excess water or oil mix on the slice. A water flow rate of less than 0.25 litres to 3 litres of water per minute per nozzle or preferably 0.5 to 1 litre per minute per nozzle is typically sufficient for controlled oil removal to 5% to 10% oil content in the finished chip. Effective de-oiling can be achieved with contact times between the food slice and water knife of around 0.25 seconds to 1 second, which is approximately 2 to 4 metres per minute on a belt conveyor. Longer exposure times, for example 5 seconds, or higher water flow rates, for example 6 litres per minute, are feasible but only necessary when very low oil levels, for example less than 3%, are required.

In the most preferred embodiment, to reduce the amount of water used or to avoid removing too much oil, a water spray comprising a mist of fine droplets of water can be applied to the food slice to act as a gentler oil removal media. This effect can be demonstrated with a handheld garden spray or by adding compressed air to the water spray nozzle. Water temperature can be varied to suit the food slice being processed however ambient to cool water is preferred for starchy food slices like potato that are susceptible to gelatinization in contact with excess warm or hot water. Water and oil pooled on top of the slices after passing through the water knife or water spray is very mobile and can either be drained or very easily blown or sucked off the food slice surfaces with air knives and or vacuum suction above or below the food slices. While spreading the slices to minimize overlap improves the consistency of oil removal slice to slice, it is not necessary to monolayer the food slices to achieve an acceptable average oil content and range in the finished product. Therefore, controlled exposure to water in this way does not require a monolayer presentation of food slices to successfully remove oil and the use of air knives is sufficient to separate the slices to remove remaining water/oil mix for further processing, which makes cold water a preferred medium for simple and cost effective de-oiling. As with other oil removal methods, a displaced water/oil mix can be separated in a settling tank or via centrifuge in order to quickly reclaim the oil which can then be reused in the lipophilic preconditioning step to minimize unnecessary wastage.

Slices from oil removal steps involving wet media can be further processed using the surface drying and pre-drying methods disclosed later in this invention. However, for some food slices the processor may find it preferable to use an oil removal method that minimizes or fully eliminates the exposure of the food slice to wet steam or water. Oil removal in this way can avoid product handling issues that occur when starch on the surface of a food slice becomes sticky due to gelatinization in the presence of heat and water or condensate. In one embodiment an oil knife is used in a similar way to a water knife in order to dislodge the bulk oil from the surface of the food slice and replace the surface oil of the potato slice with a very thin coating of oil. One advantage of the oil knife method is to avoid the introduction of water, steam or air that may damage the quality of the oil as it is removed, gelatinize starch or expose the slice substrate to reactions that may degrade its flavour and to reduce the need for oil and water separation processes downstream.

Oil removal 142 can be achieved on a linear drain belt which may optionally be assisted by warm environmental temperatures, for example 90 C similar to the lipophilic preconditioning step, so that the oil maintains a low viscosity in order to improve its mobility. Oil mobility on the slices can be further encouraged by gravity through an incline or vibration during conveying. This straight forward drainage method can produce high quality chips with reduced oil contents, especially when used prior to a pre-dry microwave 154 or explosive microwave drying step 200 where the internal steam pressure forces a further proportion of the oil to the surface of the slice from where it is drained by escaping steam or removed through the mechanical action of tumbling.

Blowing cool, ambient, warm or hot air onto the food slice surfaces can further assist with a simple oil removal step. This method can be demonstrated by the use of a hot air paint stripping gun available at most hardware stores. Air temperatures above 120 C are most efficient at removing oil with typical airflow rates of 4.5 to 5.5 m/s. High temperatures (e.g. 180 C to 200 C) can cause surface damage or excessive drying to the food slice and should therefore be avoided. Air temperature, air velocity at the slice surface, exposure time and angle of impingement can all be used as variables to control the amount of oil removed. An exposure time of 5 to 90 seconds or preferably 10 to 20 seconds and an impingement angle close to 90 degrees is preferred for effectiveness of oil removal and ease of product handling. Humidification of the air may further assist the oil removal process. The oil removal method may also be carried out by using a series of pressurized air manifolds or air knives mounted above and/or below an open mesh transport belt. Oil contents around half that of fried counterparts can be achieved. For example a thin potato slice may have finished oil content after drying of 15% to 18% compared to a fried counterpart of around 36%.

To further improve the amount of oil removed, the manifolds can be fitted with nozzles selected to increase the degree of impingement of the oil-removing fluid on the food slice surface. For example, a manifold fitted with slotted nozzles SL31 supplied by Delevan Spray Technologies or VEEJET H1/4USS from Spraying systems company and mounted almost perpendicular to a linear transport belt at a distance of 10 mm to 50 mm but preferably 10 mm to 25 mm above and below the food slice surface create a physical curtain or knife of gaseous fluid through which the food slice is transported while the surface oil is held back or blown back. By adjusting the gaseous fluid pressure, nozzle height, nozzle impingement angle or exposure time the oil content in the final chip can be controlled. A manifold pressure of 1.0 to 7.0 bar but preferably 1.5 to 3.0 bar is sufficient to reduce the oil in a food slice to approximately 15% in 5 seconds contact time for the orientation described.

Steam is a more effective method of removing oil than air and achieves the same oil content more quickly Food slices can be almost fully de-oiled with steam in a single pass to less than 3% oil in the finished chip provided the oil removal equipment is maintained substantially free of excess oil. The exact process conditions must be optimized for the food slice being treated with longer exposure times and higher pressures or fluid velocities favoring greater oil removal. However, a reducing exponential return can be expected between energy expended and amount of oil removed so the exact process conditions also depend on the level of oil to which the food slice is to be reduced. In a preferred embodiment a steam knife or manifold fitted with fan shape nozzles, for example SL31 supplied by Delevan Spray Technologies or VEEJET H1/4USS from Spraying systems company, is mounted at 20 mm to 30 mm above and below food slices exiting the warm oil dip. In one embodiment, saturated steam is delivered through the manifold at 0.5 to 3.0 bar steam pressure to reduce the oil content to between 14% to 7% by weight of dried food slice. Food slices may be presented to the single pass steam oil-removal curtain on a belt conveyor traveling at 2 to 4 metres per minute to give an approximate contact time between slice area and steam of 0.25 seconds to 1 second. Higher steam pressures result in lower oil contents but obey a power law of diminishing returns whereby the benefit of further marginal oil reductions for steam pressures above 3 bar for the manifold height disclosed must be evaluated versus other effects that may be induced, for example slice displacement on the conveyor. Longer contact times, or higher water phase content of the steam can also be used to reduce the oil content further.

The oil removal chamber will benefit from a top and bottom belt to control food slice transport and maintain good presentation of the food slice to the oil-removing curtain by minimizing slice agitation. Continuous belt cleaning and vapour extraction to remove excess oil will assist with maintaining a clean local environment in the oil removal unit, which will benefit the ability of the processor to control the food slices to the target oil level. Extraction can be achieved with suction plenums mounted above and optionally below the transport conveyor. The oil removal effectiveness and evenness may also benefit from briefly fluidizing the slices to aid distribution and separation, for example by utilizing several manifolds or knives expelling air or another gaseous fluid before the oil removal media is encountered. In one embodiment steam as the oil removal media is used to fluidize the slices. The top and bottom belts should be constructed with a large open mesh area and one or both may optionally have resistant but compressible properties, provided for example by thin gauge metal wire or rubber polymer constructs, that assist the distribution of slices exposed to turbulent conditions caused by air or other gaseous fluid flows. While pressurized air, superheated steam or other dry gases are suitable oil removal media, steam is preferred as the most effective gaseous oil-removal medium.

Alternative oil removal media include, but are not limited, to superheated steam (dry steam) or nitrogen. Superheated steam may be used at high temperatures, for example 160 C, however marginally superheated temperatures of, for example, 105 C simplify the processing requirements. These media offer an advantage over air since they exclude oxygen from contact with the oil or food slice surface, which avoids oxidation and preserves quality. Similarly nitrogen or super heated steam offer an advantage over wet steam since they exclude water from contact with the oil or food slice surface, which avoids hydrolysis of oil and preserves food slice quality and structure. Dry media and wet media may be used on their own or in any combination with each other for example, and illustration only, steam stripping followed by nitrogen stripping. The processor may select the most suitable method taking into account the properties of the food slice being treated and the oil reduction desired.

In one embodiment steam is reclaimed from the primary explosive drying step and compressed for use at the oil removal step.

In one embodiment, oil removal is performed in a rotary drum to achieve a fat content of less than half the fried counterpart. The oil removal drum may be based on a rotary dryer with a hot air manifold mounted internally or can be a perforated rotating drum, that is optionally mounted inside a hot air circulating oven, and has a directional hot air manifold mounted along its center. As described above, other media for example nitrogen, steam or superheated steam may be used as an alternative to hot air.

In one embodiment, centrifugal oil removal can be used to lower the oil content in step 142 to the desired level. In a further embodiment, oil removal is achieved through contact with surfaces that absorb the oil or mechanical skimming of the slice surface by the use of belts, brushes, rollers or presses.

Some food slices, for example starchy potato slices, that have been treated with hot media to remove oil will benefit from cooling to improve subsequent handling in the non-oil drying process. Therefore, the surface properties of the slice may be modified to reduce stickiness by cooling and removing condensate from the slice. Slices may be carried on an open conveyor or passed through a cooling tunnel. More rapid cooling can be achieved with pressurized air knives or a series of manifolds operating with compressed air and optionally equipped with selected nozzles to increase impingement on the slice surface. A dry medium is preferred for cooling but can be selected from air, nitrogen, a combination or other means. Cooling is not a necessary step if food slices do not exhibit sticky surface properties, for example as a result of lower starch availability. In this case it is preferable for energy efficiency to hot transfer the food slices at around 70 C to 90 C into the next processing stage.

The oil removal step 142 can be used to dial in and control the desired oil content to a very narrow range. In one embodiment, the food slices are treated such that the finished, dried food product comprises an oil content of less than 3% by weight. However, less intense oil removal can deliver higher oil levels in a controlled manner and in one embodiment, the food slices are treated to an oil content of less than 10% and preferably between 5% and 8% or to an oil content of less than 15% and preferably between 11-13% by weight of finished chip. Alternatively, minimal oil removal is applied to deliver a slice having about 17% to about 25% oil by weight of the finished chip or a simple drain belt with no active oil removal is used to deliver a slice having 25% to 35% oil by weight of finished chip. Consequently, one advantage of the lipophilic preconditioning step 114 using a warm oil dip is the ability to pre-select and control the oil levels in a food slice through a combination of the oil blanching and the oil removal conditions applied before drying.

Food slices prepared using either lipophilic preconditioning or flash frying followed by oil removal and cooling or alternatively oil removal, pre-drying and cooling may go on to be fully dried or, alternatively, may be packed as a half product suitable for finishing by heating at home or at a secondary location, for example a vending or catering outlet. Food slices intended for this application are preferably treated by an oil removal step to less than 15% fat and more preferably to less than 10% fat equivalent of a dried chip. The advantage of this preparation method is to deliver food slices that retain a structural oil content that benefits final chip flavor yet are substantially non-oily and non-adhering on their surface and therefore are suitable for packaging into known formats that may optionally use preservative technologies, for example inert gas flushing, vacuum packing, retort, scavenging or aseptic packing. Those skilled in the art may recognize that pasteurization or sterilization of the half-product may be achieved prior to packing by selection of appropriate time-temperature combinations during the oil removal step. The oil removal step ensures the half-product retains some oil for flavor but is not significantly oily on the surface. The half-product cleanly releases from flexible or semi-flexible packaging structures to individual slices for convenient finish cooking via the preferred method (for example pan frying with or without oil, hot air oven, infra-red toasting oven, steam oven or microwave) at the preferred location (for example at home or at a vending, catering or snacks manufacturing site). Thus, one advantage of this preparation method is to enable the end user to experience a low oil, healthy and convenient hot snack product.

Those skilled in the art will recognize that partial drying of the half-product prepared with this method can further improve its suitability for packaging and further increase convenience for the end user. Non-oil par-drying methods, for example baking in a microwave oven, impingement oven or conventional hot air oven are preferred and, using the methods described later in this disclosure the moisture content will preferably be reduced below the starch melting point, typically less than 1 gram of moisture per gram of solids in potato based foods, or more preferably below the starch glass transition point, typically less than 0.25 grams of moisture per gram of solids in potato based food substrates. One advantage over heating a half-product compared to a regular dried snack is that the higher moisture content ensures a more consistent and pleasant finished snack.

In an alternative embodiment to dry thermal preconditioning or lipophilic preconditioning, the potato slices can be thermally preconditioned 110 in water or steam at about 60° C. to about 99.9° C. for between about 50 seconds and about 3 minutes depending on the heat transfer required by the food slice dimensions. For example, a potato stick (French fry shape) food slice typically requires 3 minutes at about 80° C. to about 90° C. whereas a thin potato slice or slab typically requires about 90 seconds at about 80° C. to about 90° C.

Optionally, after thermal preconditioning in water 110, the potato slices are then washed 120 in a water wash to further reduce gelatinized surface starch. The washing step may use hot water (typically about 50° C. to about 65° C.) to improve starch solubilisation. In one embodiment, the washing step 120 continuously uses cold water (typically about 15° C. to about 25° C.) that quenches the thermal preconditioning process and improves the crispness of the final product texture, which is thought to be due to retrogradation of starch components. Either wash may optionally contain marinade ingredients. Removal of excess gelatinized surface starch will lessen the tendency of the potato slices to stick or clump together in later drying steps. A model No. PSSW-MCB speed washer available from Heat and Control, Inc., of Hayward, Calif. USA can be used to remove the surface starch with hot or cold water. In one embodiment, a cold water wash 120 of about 15° C. to about 20° C. containing from about 0.5% up to about 4% salt in solution can be used. One advantage of salt marinade is to improve the coupling efficiency and/or intensity of the primary, explosive drying step 200 when a microwave is used. Alternatively, in one embodiment, a hot water wash 120 can help to solubilise excess starch gelatinized by blanching a high-starch food or specific potato varieties noted to release significant amounts of free starch (e.g. Atlantic) to aid in subsequent processing. In an alternative embodiment the gelatinized starch is removed by pressurized water sprays at 1.5 to 3.0 bar mounted at 25 to 50 mm above the transport belt or above and below the transport belt to impinge on the slice surface. Both an upper and lower belt can be used to contain the product during transport through the high-pressure water jets, which act to de-gum the product surface and reduce the ability of slices to adhere to each other.

Optionally, during, prior to, or after any thermal preconditioning step 110 112 114, the food slices can be marinated meaning that they are exposed to a solution having one or more dissolved compounds to improve the coupling efficiency of the microwave step or modify the final product attributes. Consequently, in one embodiment, the marinade comprises one or more ingredients selected from protective and anti-oxidant ingredients such as sodium sulphite or bisulphate, ascorbic acid (water soluble) or tocopherols (oil soluble); color enhancers such as beta-carotene, and annatto; pH modifiers such as citric or acetic acids; ionic salts such as potassium, sodium or calcium chlorides; enzymes such as glucose oxidase, laccase, lipase, pentosanase, transglutaminase, asparaginase, cellulase or amylase; carbohydrate sugars such as glucose, fructose, maltose, trehalose, and maillard reaction ingredients or long chain carbohydrates such as carageenan, arabic or guar gums, carboxymehyl cellulose, hydroxypropyl cellulose, native or modified starches or protein. Because the objective of the thermal preconditioning step 110 112 114 is to deactivate enzymes rather than reduce the potato slice glucose content, as in classic potato crisp frying, it can be beneficial for the thermal preconditioning medium to be fully saturated either by added marinade ingredients or by the starches solubilised from the food slice itself so that no further inherent flavor compounds are solubilised and lost which can lead to a bland flavor in the final crisp.

The thermal preconditioning, marinade, or washing system can be configured so that slices exit in a way that maximizes separation between slices and minimizes overlap on the next transport section of the process line. A speed wash, available from Heat and Control of Haywood, Calif., USA, is an example of suitable equipment to achieve this in a way that will improve the ease of processing in later unit operations.

The potato slices can then optionally be dewatered 130 to remove surface water and reduce surface tension between slices to prevent clumping in later drying steps by contact with hot or cold air knives for about 2 to about 3 seconds. In one embodiment, the dewatering step reduces the free water (e.g. unbound water outside the potato slice picked up in the washing or blanching stages) from about 20% by weight to about 7 to about 10% by weight.

Surface moisture can be removed using an air sweep-type dryer that employs air knives. In one embodiment, air knives comprise heated or unheated (ambient) jets of air that are directed above the washed potato slice while vacuum suction carries away the dislodged moisture. In one embodiment, low pressure air (e.g. about 1.0 to about 1.4 bar) having a temperature of between about ambient and about 120° C. and a flow speed of between about 12 and about 16 meters per second can be used for sufficient time to remove the free surface water. In one embodiment, a multi-pass air knife, longitudinal air tunnel, or Turbo Air Sweep as manufactured by Heat and Control can be used. In an alternative embodiment the slices are carried on a chain link, perforated or mesh conveyor under and above a series of fine air knives generated by manifolds at 1.5 to 3 bar pressure fitted with slotted nozzles supplied by Delevan Spray Technologies and mounted perpendicularly at 10 to 50 mm above and below the slices. A top and bottom conveyor belt arrangement may be used to control slice agitation and achieve effective surface water removal.

In one embodiment, the surface moisture is substantially removed in a surface drying step 140 to prevent sticking and clumping in later unit operations and delivers the slices evenly distributed across a belt which is sufficiently wide and fast enough to ensure even coverage with minimal overlap. While monolayered slices may be considered the ideal process condition and has been cited as a necessary arrangement step in prior art applications (e.g. U.S. Pat. No. 5,298,707), it is important to appreciate that monolayering is not required for this invention and sliced food will be converted into individual finished crisps at the end of the process. Therefore, partial overlap of at least two slices is acceptable, which significantly simplifies the production process, reduces footprint and improves overall economics. Consequently, in one embodiment, transport, oiling or drying belt coverage comprises a partial overlap of two or more slices and may use a perforated belt constructed from metal links, which may optionally have a non-stick coating or use a polymer belt such as polypropylene, polyester or polytetrafluoroethylene (PTFE), which may optionally be tessellated or perforated to further reduce surface area contact and incidence of product adhesion to the transport belt.

In one embodiment, for those substrates where subsequent handling requires a very dry surface, surface water removal can be further enhanced by routing the potato slices from air knives to an air impingement or air jet impingement oven for between about 30 to about 180 seconds or more preferably from about 60 to about 120 seconds in air having a temperature of between about 60° C. to about 160° C. or more preferably about 120° C. to about 140° C. The time/temperature combination should be selected to dry the slice surface as fast as possible at the highest temperature that avoids excessive gelatinization of any surface starch. Air flows may typically range from about 1 to about 3 msec and should be sufficient to contact as much surface area of all sides of the food slice as possible without excessive lifting or displacement from the transport belt, which may cause tearing, damage or loss of control of the food slice. If required, a hold-down belt can be used above the food slices to control agitation. An AIR-FORCE Impingement Oven available from Heat and Control, Inc. of Hayward, Calif., USA can be used. The objective is to remove as much of the surface moisture as possible and to try to achieve a surface moisture as close to about 0% as possible to minimize surface tension effects and optimize handling characteristics in later unit operations. This amount of surface moisture removal however may not be necessary for all food slice substrates or even all potato varieties. As used herein, about 0% surface moisture is defined such that if absorbent paper is applied to the food slice no water is absorbed by the paper. The removal of sufficient surface moisture has occurred when the overall moisture content of the potato slices has reached or is lower than the native water content e.g., the water content after slicing or prior to a blanching step. In one embodiment, the surface drying step 140 reduces the free water from about 7% to about 10% by weight to less than about 2% by weight and preferably to about 0% by weight.

In one embodiment, the potato slices are further dried in a pre-drying step 150 which may utilize a microwave oven, infra-red oven, a forced hot air oven or a combination of these may be treated as a continuation of the surface drying step with the aim of improving the overall cost or energy efficiencies of the drying process. A hot air conveyor dryer, commercially available from Aeroglide of Raleigh, N.C., USA, or a hot air rotary dryer (often used in the food industry for rice and seeds) can be used to reduce the moisture content by up to half of the native, raw material starting moisture content. The lowest moisture content exiting the pre-drying step 150 can be set as the point at which all 'unbound' moisture has been removed from the food slice. In one embodiment, potato slices leaving the pre-drying step 150 comprise a moisture content of between about 50% by weight and its native moisture content (typically about 80% for a potato slice) and more preferably between about 65% and about 75% by weight. Hot air drying conditions should preferably be maintained at air temperatures of about 110° C. to about 140° C. for about 60 seconds to about 120 seconds. If the hot air pre-drying step 150 reduces the average moisture content to at least 78% or lower it can improve the mechanical strength of the slice and help reduce excessive deformations such as folding, balling up or clumping in subsequent explosive dehydration if this is performed using deep bed or rotary drying as the explosive dehydration step 200. The improvement in mechanical strength when applying hot air drying is thought to come from creating an 'exo-skeleton' by drying surface cells beyond their limp, low turgidity phase to create a rigidised surface cell layer. In this way the dry surface is able to support the body of the potato slice and mechanically resist the tendency to fold and collapse when tumbling. Air impingement ovens can be used to generate mechanical strength in the slice and the higher temperature, of for example 220 C to 260 C, at impingement air velocities reduces the processing time to around 15 to 45 seconds. However air impingement is most effective when food slices are monolayered on a transport belt and this same hot air exposure can degrade the finished chip texture and flavour.

Pre-drying 154 is also preferably used directly after lipophilic preconditioning 114 or after oil removal 142. A microwave, infra-red or forced hot air oven are suitable processing steps as described above, however in this case pre-drying in a microwave oven 154 is preferred as it minimizes exposure of the oil coating to hot air which can drive oxidation. In addition, pre-drying is most easily performed using a linear, belted oven on which the slices are spread. The penetration of microwave energy means that a microwave pre-dry does not require a monolayer of food slices. It is less dependant on good spread and separation of slices than a hot air or infra-red pre-dry where the energy must directly contact all surfaces for efficient heating. A significant function of pre-drying is to ensure the slice has sufficient mechanical strength to pass through a deep bed rotary or otherwise agitated explosive dryer 200 without creating excessive defects to the shape or singulation of the finished chips. Studies by others have shown that during the early stages of drying of potato or other vegetable slices, loss of turgid pressure in the cell walls leads to a limp slice that is incapable of supporting itself and is more likely to stick to surfaces. A slice at this stage of dehydration is very prone to collapsing into undesirable shape defects, single or multiple folds, clumps and multiple slice clusters when it encounters deformational mechanical forces during drying. This phenomenon has been a historical barrier to the use deep bed drying or agitated drying systems as disclosed in this invention. Therefore, one benefit of pre-drying is to enable the use of higher capacity, smaller footprint deep bed processing methods where food slices are continuously agitated or tumbled. The benefits of deep bed drying are realized since the pre-drying step 154 is for a brief period only and can be inserted between other deep bed equipment without the need to monolayer. The applicants have designed a solution using a linear microwave pre-dryer that transports the slices on a belt to eliminate the shape defect issue.

Without being bound by theory, if the extent of pre-drying selected is relatively low, then the slices will enter the subsequent deep-bed unit still in a flaccid state, and the overall improvement in final product shape may be explained by the simple reduction in the proportion of overall drying time the slice undergoes with no physical support of its form while it is still flaccid before the subsequent hardening due to dehydration. Without being bound by theory, if the extent of pre-drying sets up a moisture gradient in the food slice such that a part of the slice becomes hard or semi-rigid then this skeleton can support the slice during subsequent deep bed drying. The moisture gradient may occur between the outer surfaces of the food slice and its internal center, for example when applying infra red or hot air, or the moisture gradient may occur between the outer circumference of the food slice and its geometric center, where the geometric center becomes more dry and rigid than the outer areas. This latter case is a feature of microwave drying or microwave pre-drying as disclosed herein, so that the slice structure at the center of the food slice can just be set during the supported pre-drying stage, while the outer area remains rubbery due to its higher moisture content. Initiating the setting of the chip structure creates an 'endo-skeleton' at the center of the food slice that will still allow the slice to remain elastic and adopt a curl shape during subsequent drying steps but will prevent undesirable shape defects or clumping due to the chip completely folding during the rotary, agitated explosive drying step 200.

A microwave pre-dryer can fulfill this function with significant slice overlap and without the need to monolayer since the moisture content is only partially reduced. Reducing the moisture content of overlapping slices too low will result in sticking and welding of the slices to each other creating inseparable clusters. Therefore, one benefit of pre-drying 154 is to remove a large amount of water in a way that the slices do not weld together and will be separated in the subsequent rotary, agitated drying step to produce singulated chips. A microwave pre-dryer can maintain the explosive drying rates disclosed later in this invention. Therefore this step may range from 5 seconds to 90 seconds but is typically 5 seconds to 45 seconds in duration but preferably 10 seconds to 20 seconds in duration, constituting a portion of the first drying phase and may remove sufficient water to approach the first carbohydrate transition point in the food slice as described later in this application. It is possible the processor will remove 50% or more of the water content of a food slice with a pre-dryer which comprises a belt microwave where slices are allowed to touch and overlap, however lower moistures increase the risk of product sticking and forming clumps and increases the hazards of arc formation and consequent fires. Preferably therefore, microwave pre-drying may be used to remove between one quarter and one half of the initial water, for example reducing the average slice moisture content from around 80% to around 75% wet basis (from approximately 4:1 to 3:1 dry basis) or around 80% to around 65% wet basis (from approximately 4:1 to 2:1 dry basis).

Techniques cited in prior art demonstrate that a linear microwave might be used to dry the slice to a palatable degree. However, in order to achieve this, a significant technology hurdle must be addressed to achieve perfect singulation of slices traveling through the linear microwave in order to avoid spontaneous ignition which has been observed by the Applicants when more than one slice is in close proximity or overlapping. The prior art does not teach how to overcome the overlapping problem and related risks, therefore, this prior art is limited to low commercial production rates and is subject to the risk of incendiary incidences due to the high probability of close contact or overlapping of more than one food slice due to imperfect slice placement technology. If it becomes technically and commercially viable to monolayer the food slices so that slices are at least around 5 mm apart from any other slice, for example if slices are deposited on the belt in a controlled manner, then a linear microwave can be used to achieve the full explosive drying step 200 with a greatly reduced risk of arcing or fire.

The food slices that have not been previously lipophilically preconditioned or flash fried can then be coated with oil in an oil coating step 160 to a controlled level as required in the final product. Oil is important to the development and finished texture, flavor and mouth feel of the potato crisps. A thin coating of oil, preferably applied in droplet form, can help control the number and size of blisters that are formed when the potato slice is explosively dehydrated 200 in the primary dryer.

The amount of oil imparted by the coating step 160 can be controlled to obtain desired nutritional and organoleptical properties. Any oil or fat is suitable for the process disclosed including vegetable oil, animal fats or synthetic oils, for example coconut oil, corn oil, cottonseed oil, palm oil, palm olein, linseed oil, safflower oil, high oleic safflower oil, palm stearin, soybean oil, sunflower oil, mid or high oleic sunflower oil, rape seed oil, lard, tallow, fish oils, olestra, sucrose polyesters, medium chain fatty acids, diacyl glycerols, or a blend of different oils. The choice of oil can be used to influence the final flavor and mouth feel of the finished crisp as well as the nutrition profile.

In one embodiment, the amount of oil added 160 is such that the oil content of the finished dried potato slice is less than about 10% by weight and more preferably between about 5% and about 8% by weight. In an alternative embodiment, oil is added to achieve an oil content of less than about 25% by finished crisp weight and more preferably about 13% to about 18% so that the finished oil content is less than half that of regular crisps today.

In one embodiment, oil is added 160 to the potato slices by a rotary oiler comprising spray nozzles mounted on an oil lance placed in a rotary drum. The application rate of the oil may be controlled by a simple drum pump and may be measured with a flow meter if desired. For increased accuracy, the flow meter can be calibrated to a mass weighbelt, vibro weighbelt or similar device on the infeed or outfeed of the drum. A rotary drum design similar to those used to season snack foods can be used. In one embodiment, the potato slices are in a rotary oiler, 800 mm in diameter, for between about 10 to about 30 seconds tumbling at about 10 to about 30 rpm. The rpm should be set to maintain sufficient slice separation for coating however, the exact values will depend on the drum dimensions selected for the quantity of slices to be oiled. Preferably, the drum is made from a textured metal or coated with an anti-sticking material such as polytetrafluoroethylene (PTFE) or a fluoropolymer to minimize product sticking to the drum walls. In one embodiment, a perforated or scored pattern can be placed along the drum interior. In one embodiment, the drum interior comprises a longitudinal flight to assist the tumbling action and segregation of the food slices. A longitudinal flight or Archimedes screw can also be used to control dwell time inside the drum. One advantage of a rotary oiler is that the oil can be added to potato slices without the need to monolayer and the unit can physically de-clump any slices that may have grouped together.

In one embodiment, the coating step 160 comprises a monolayer oil spray or alternatively a bakery oiler comprising a spinning plate or a vertical oil curtain can be used for products which are suited to or have been monolayered. In one embodiment, the coating step 160 comprises marinating the potato slices in oil at ambient temperatures or blanching or flash frying in oil at higher temperatures as described above. In one embodiment, the pre-drying step 150 and oil coating step 160 occurs in the same rotary device. In one embodiment, oil addition 160 occurs during the explosive dehydration step 200.

The addition of oil 160 to the food slice produces several advantages. For example, oil can be used to control the formation of blisters so that many small blisters form where otherwise large bubble blisters may occur. This is particularly true at lower drying rates (longer drying times) when steam is generated less rapidly. At higher drying rates, the explosive dehydration has a similar result by a different mechanism since rapidly escaping steam to relieve internal pressure creates a porous structure. Further, oil is heated in the microwave particularly when moisture contents are low as in phase 3 of the drying curve described later. The heating initiates a chemical-food reaction in the oil that develops fried flavor notes. A similar effect can be achieved if the oil is "conditioned" by heating off line, either using conventional heating methods, microwave energy or otherwise and then applied via a spray onto the product. In fact, the oil can be "conditioned" by using the oil first in other applications, such as a heating medium for another food line. Instead of disposing the oil at the end of its useful application as a heating medium, it can be reused as an oil additive in Applicants' invention. When Applicants refer to "conditioned" oil, this includes oil that has been worked previously by any means, including, but not limited to, heat, oxidation, and hydrolysis other thermal conditioning methods or lipophilic pre-conditioning. If oil is applied to the product prior to microwaving, the oil confers the additional advantage of acting as an energy or heat sink towards the end of the drying cycle when the moisture content is low. This is evidenced by experiments conducted by the inventors that reveal higher exit temperatures for a given time or moisture content of products which have been oiled prior to microwave drying verses non-oiled products. Consequently, adding oil prior to the explosive dehydration step 200 reduces the incidence of scorching in the microwave and drying is therefore assisted to lower final moisture contents without generating undesirable browning or burnt flavour notes in the potato crisp or snack.

The potato slices are then routed to a microwave for the explosive dehydration 200 step. To improve process control and enable more accurate drying at high rates, food slices may be routed via a mass feed weighbelt. A similar advantage is obtained for food slices originating from doughs by forming and depositing in pieces of controlled volume or mass. As used herein the terms, "explosive drying," "explosive dehydration," "rapidly dehydrated" and "primary drying" are synonymous and are defined as simulating a dehydration profile corresponding to a fried food product that occurs in a non-oil medium. The non-oil heating medium can include but is not limited to, microwave radiation, infrared radiation, radio frequency radiation, superheated steam, air and combinations thereof. The primary energy source applied for evaporation of water by non-oil heating may be supplemented with additional heat sources or energy sources such as hot air, steam, superheated steam, microwave, infrared or radio frequency radiation. Commercial production of potato crisps typically involves a continuous process wherein sliced potatoes are continuously introduced into a vat of frying oil at a temperature of about 365° F. (about 185° C.), conveyed through the oil by paddles or other means, and removed from the oil after about two and one-half to three minutes of frying by an endless conveyor belt when the moisture content of the crisps has been reduced to about 2% or less by weight of fried chip (equivalent to around 3.0% or less of finished chip potato weight). The resulting product generally has texture and flavor characteristics, which are usually recognizable by consumers as typical commercially produced continuous process potato crisps.

Figure 4:
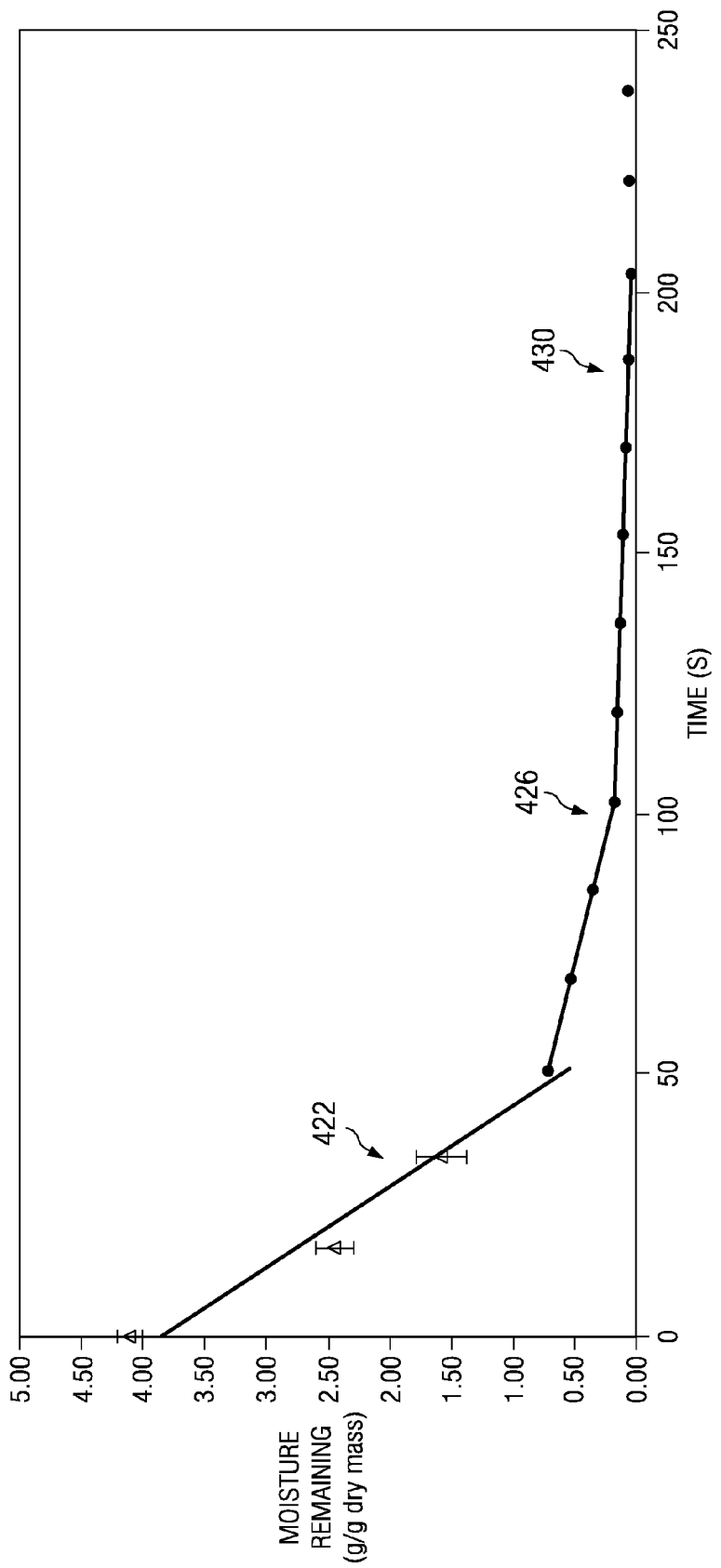
FIG. 4 is a graphical representation of the dehydration profile of a plurality of potato slices in accordance with one embodiment of the present invention.
Figure 6:
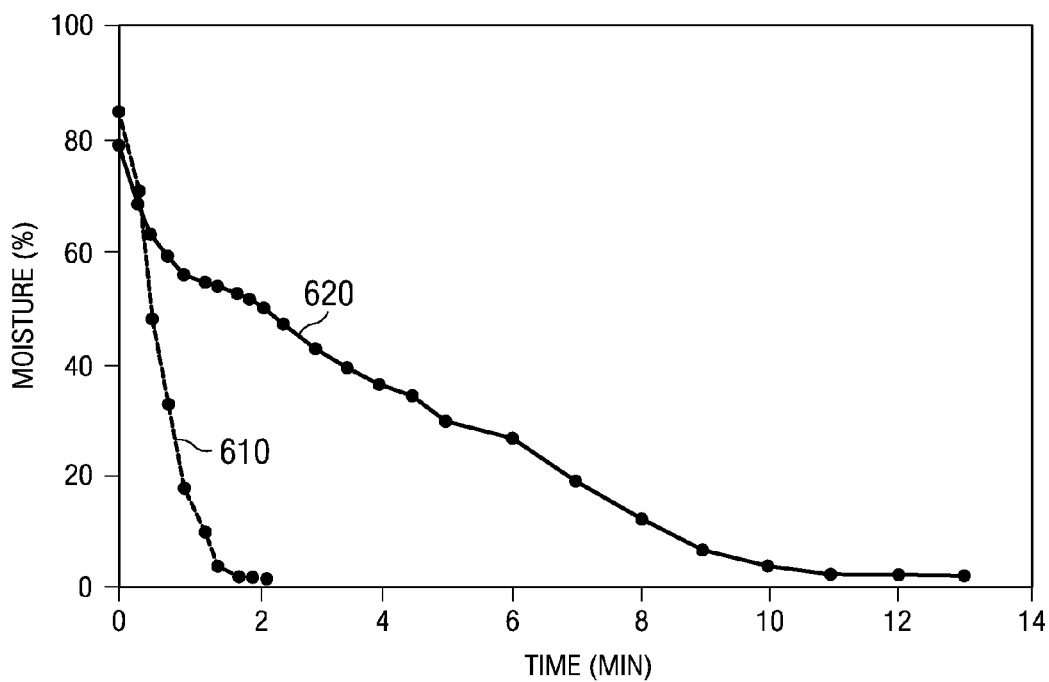
FIG. 6 depicts a prior art dehydration profiles of continuously fried potato slices and batch kettle fried potato slices.

FIG. 6 depicts a prior art dehydration profile of continuously fried potato crisps 610, and is taken from FIG. 4 of U.S. Pat. No. 5,643,626, assigned to the same assignee as the present invention. As shown, a potato slice having a moisture content of greater than about 80% is dehydrated to a moisture content of about 20% about one minute and to a moisture content of less than about 3% in about 2 minutes. Also shown by FIG. 6 is the dehydration profile of a batch kettle fried hard bite potato crisp having a slower dehydration profile 620 but still cooked in hot oil. Either of these dehydration profiles 610, 620 can be simulated in a non-oil medium in accordance with embodiments of the present invention. By simulating these drying profiles, the present invention can also simulate the different finished crisp textures associated with these two dehydration profiles 610, 620 or any profile in the spectrum of either atmospheric or vacuum frying. Not to be limited by theory, the inventors believe that by simulating the dehydration profile, the invention also effectively simulates the starch conversion that occurs and is largely responsible for the finished crisp texture. In this context 'starch conversion' refers to the temperature and moisture content of the majority of carbohydrates in the food slice as the majority of carbohydrates pass through each transition and the time the majority of carbohydrates spend in each transition phase (molten/liquid, rubbery/elastic or glass/crystalline). Carbohydrate melting and transition points have been determined and published elsewhere using simple capillary studies or techniques like Diffraction Scanning calorimetry (DSC) to measure enthalpy changes.

The present invention can be used to mimic the dehydration profile of any fried food. Consequently, in one embodiment, the present invention provides a method for microwave cooking a food product to mimic the organoleptic characteristics of a fry-cooked product. An example of how the present invention can be utilized to provide a non-fried potato crisp having a dehydration profile that mimics the dehydration profile of a continuously fried potato crisp is provided below.

First, a dehydration profile corresponding to a fried food product is identified. For example, as previously indicated, FIG. 6 depicts the dehydration profile of continuously fried potato crisps 610 and the dehydration profile of batch kettle fried hard bite potato crisps 620. In one embodiment, the dehydration profile of a fried food can be determined by using a continuous flume fryer and removing samples at various distances related to certain times or a batch catering fryer where samples are 'fished' out of the oil at certain times and moisture content then determined. Next the food product is prepared for microwave cooking. For example, a potato can be prepared by blanching, thermal conditioning or lipophilic preconditioning and optional pre-drying. The potato slices can then be cooked at a controlled power corresponding to the power required to reproduce, mimic, or create a substantially similar desired dehydration profile 610, 620 as depicted in FIG. 6. This can be accomplished through trial and error by, for example, experimenting with a belted microwave under constant power settings, one can remove the microwaved food products at certain times and positions to determine the related moisture contents. The power level can be adjusted as required for the specific microwave system and food slice combination in use. Consequently, in accordance with one embodiment of the present invention, the controlled power corresponding to the power required to reproduce a dehydration profile of a fried food product comprises a first microwave power and a second microwave power. In one embodiment, the controlled power corresponds to transition points in the dehydration rate of the food slice which are believed to relate to starch transitions. The above example is provided for purposes of illustration and not limitation. The same method described above can be used to mimic the dehydration profile of other fried food products including, but not limited to tortilla crisps, corn crisps, French fries and hash browns. Other products may have different carbohydrate compositions and different initial moisture contents and may optionally have been pre-dried (e.g. in a toasting oven), therefore, microwave drying profile should be adapted to suit, as described above.

In one embodiment, the explosive dehydration step 200 comprises simulating a dehydration profile to a moisture content of between about 2% and about 15% and preferably between about 4% and about 8% by weight in an amount of time that is similar to the time required for the comparison fried food product. The dehydration rates and starch conversion rates in the first two phases of the dehydration profile should be similar to and preferably match those of the comparison fried food product to achieve similar texture. For example, in one potato-based embodiment, the present invention comprises dehydrating the moisture content in a plurality of potato slices from greater than about 60% moisture by weight to less than about 20% moisture by weight in a non-oil medium in less than about 60 seconds. In one embodiment, the explosive dehydration step 200 further comprises reducing the moisture content in the slices from a first moisture content of between about 65% to about 80% by weight to less than about 15% by weight in a non-oil medium in less than about 120 seconds. In one embodiment, the explosive dehydration step further comprises reducing the moisture content to less than about 10% by weight or preferably less than about 2% by weight in the explosive dehydration step in less than about 180 seconds.

Figure 2:
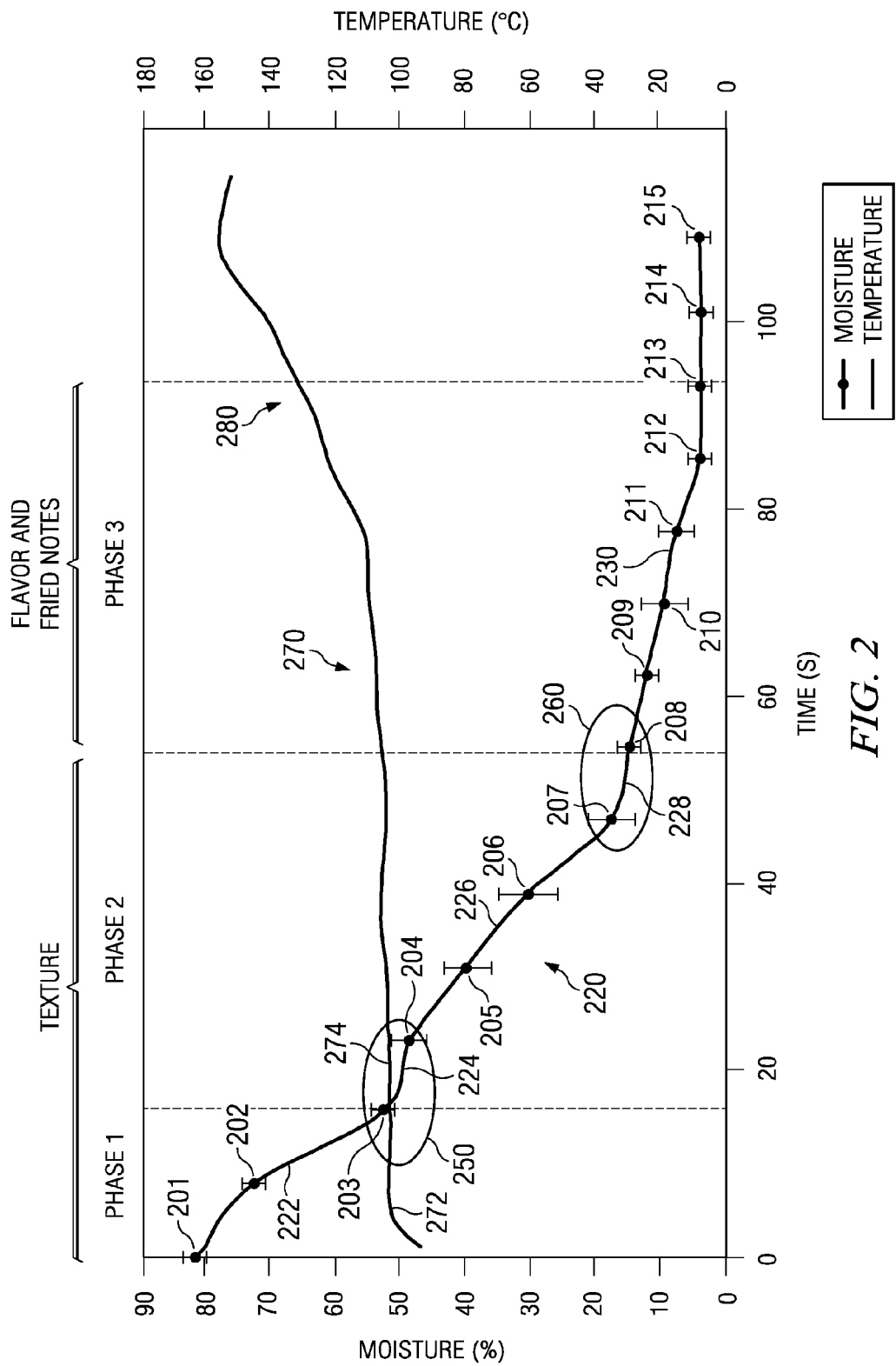
FIG. 2 is a graphical representation of the dehydration and temperature profile of a plurality of potato slices undergoing an explosive dehydration step in accordance with one embodiment of the present invention.

FIG. 2 is a graphical representation of the moisture content as depicted by the moisture dehydration curve 220 and temperature profile 270 of a potato slice undergoing an explosive dehydration step in a microwave in accordance with one embodiment of the present invention. As shown, prior to explosive dehydration, the potato slice comprises its native, raw state moisture content of just over about 80% moisture by total weight 201. Of course, in accordance with other embodiments of the present invention a blanched and/or par-dried potato slice can comprise a lower moisture content, as described above. Different potato varieties or other food materials (for example carrots, parsnips, broccoli or cauliflower) will have different raw moisture contents that may be different than described here. At this point, 201, the potato slice is wet, slippery, rubbery, and flexible. As the potato slice becomes more dehydrated, it becomes drier, less slippery, but remains rubbery and flexible 202. At point 202 the slice is limp and has little ability to resist folding due to a loss in turgid pressure. Onsets of blistering begin to appear throughout the slice, but the biggest concentration of the blistering occurs mainly at the edges as small, flat, irregular shapes. The onset of the blister formations can peel off implying potential steam explosions from within the slice. No puffing is observed at this point 202. In this approximate same time frame, the potato slice temperature reaches the boiling point temperature 272 and there is a relatively high rate of water vaporization 222. At the point depicted by numeral 203, the potato slice is drier than in 202 and there is an appearance of larger onsets of blistering throughout the slice. Some rigidity has been restored to the slice at the center however, the potato slice is still flexible and other areas feel rubbery. The potato slice is not slippery at this point 203. The temperature of the potato slice remains flat 274 for a while after the potato slice approximately reaches the boiling point temperature of water at atmospheric pressure. There is also a slowing of the dehydration rate depicted by the slight flattening 224 of the moisture dehydration curve 220. Without being limited to theory, the inventors believe that the apparent flattening 224 of the dehydration curve coincides with the starch melting point 250 as determined in scientific literature using DSC methods, where many of the starch solids begin to melt. In the potato slice embodiment, the starch melting point 250 occurs when the slice has been dehydrated to about 50% moisture by weight and when the slice temperature is at about 100° C. For ease of interpretation, the period before this transition point has been classed as phase 1.

At point 204, the drier potato slice continues to have the appearance of more blisters throughout the slice periphery. The slice at this point 204 is still rubbery and flexible. At point 205, the potato slice is in the second drying phase (or phase 2), which occurs between the two transition points 250, 260 identified and where the starch is thought to be primarily rubber 226. The slice at point 205 is drier than the slice at 204 and there is the onset of a rough surface appearance and some degree of floppiness indicating the entire slice is not yet fully set. At point 206 the slice is hardened and appears set. Some brittleness has developed with a certain degree of give. The surface appearance is rough throughout.

At point 207, there is a flattening of the curve depicted by numeral 228. Again, without being limited to theory, the inventors believe such flattening 228 occurs as the starch enters the glass transition stage 260 and the starch solids begin to enter into a glassy state, labeled as phase 3. At point 208 the potato slice is drier and more brittle than at numeral 207 and the surface resembles a flat disk. At point 209, the potato slice is drier and more brittle. At point 210 the slice is drier and more brittle than at 209, and some puffed blisters are observed. At numerals 212, 213, 214, and 215 the potato slice is similar in appearance as in numeral 211. As the potato slice moisture content is low and the remaining moisture is less available for microwave energy to couple with in the final glassy state 230, the temperature of the food slice rises 280, which beneficially increases intensity of cooked potato flavor or imparts fried flavor notes into the food slice in the phase 3 drying stage if the slices are pre-oiled. For pre-oiled slices during phase 3 of the drying cycle, at low moisture contents, the microwave energy is thought to preferentially couple with the oil. This has been observed to generate beneficial fried flavor notes. Further, oil acts as a heat sink that helps prevent scorching and assists with moisture control at the end of the drying process. Consequently, pre-oiled slices make the process more controllable and products develop flavor more characteristic of fried chips. Steam can also be used at the end of the drying cycle to help control drying to an equal rate between slices and avoid product scorching.

Figure 3:
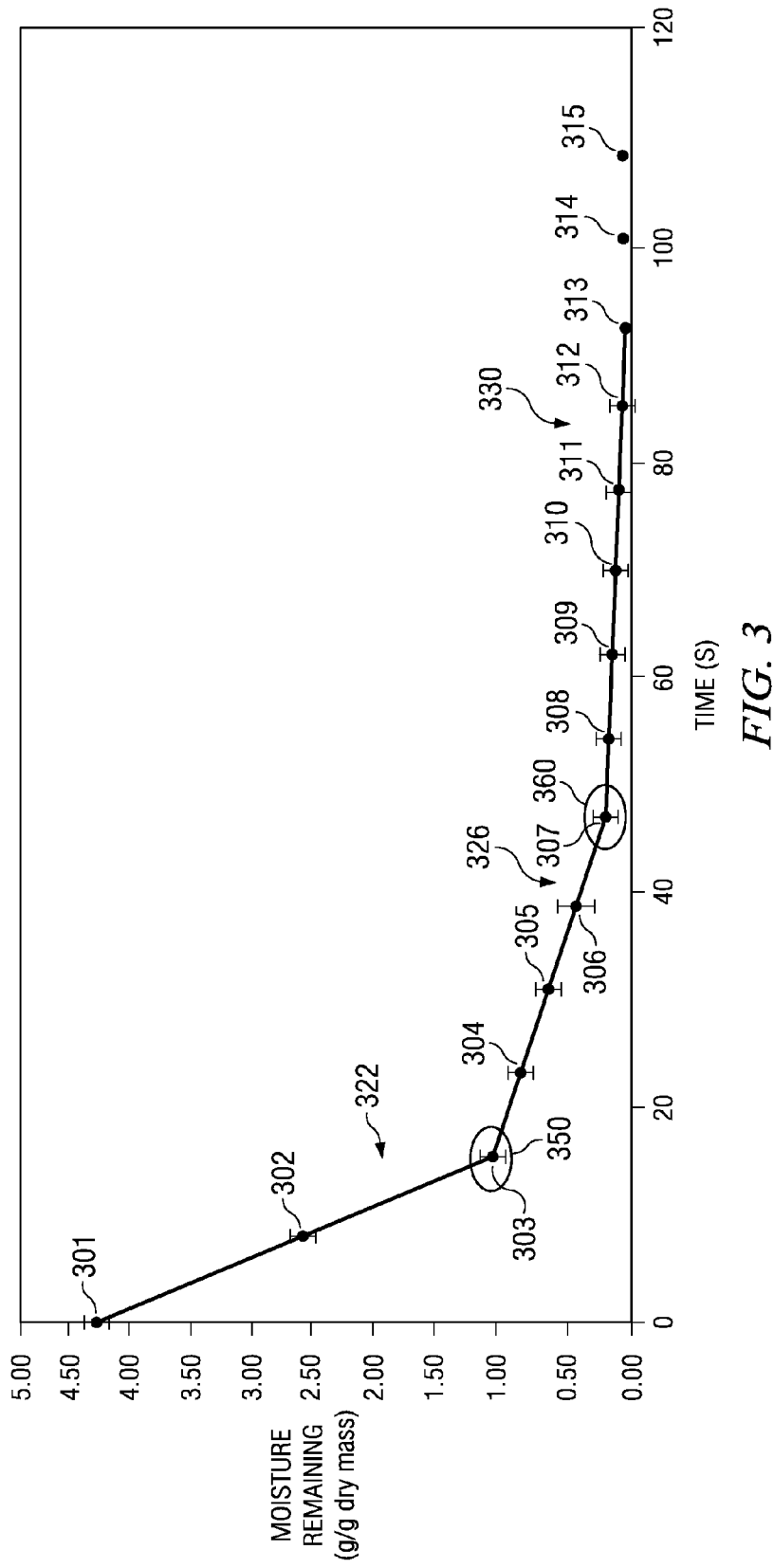
FIG. 3 is an alternative graphical representation of the dehydration profile depicted in FIG. 2.

FIG. 3 is an alternative graphical representation of the moisture content of the same potato slices depicted in FIG. 2. Instead of the moisture content being measured on a total weight basis, e.g. the water weight divided by the sum of the water weight and the dry solids, the moisture content is depicted as a ratio of the moisture remaining in the potato slice to the dry solids in the potato slice. The actual drying rates defined by grams of water removed per second as a ratio of the solids as depicted in FIG. 3 is a direct, primary and therefore more useful measure of the process conditions required to achieve target textures as opposed to a measure corresponding to the microwave power absorbed because the power absorbed by the product is specific to the cavity and product combination. The depiction as in FIG. 3 has been found to be a useful assessment tool to determine and better delineate the three different drying phases that appear to be marked by the starch transition points. Indeed, experiments have demonstrated that the drying rates and transition points can be defined accurately and are highly reproducible—especially when a homogenized food sample and/or controlled piece weight is used for determinations. Since these drying rates have been associated with different product textures, it is possible to precisely define the carbohydrate transition points and the relationship between dehydration profile and finished product attributes. It should be pointed out that the numerals 201-215 in FIG. 2 depict the same data, in different units, as the corresponding numerals 301-315 in FIG. 3.

As shown in FIG. 3, the drying curve has been divided into three distinct drying rates or phases. The first phase or first dehydration rate 322 starts when the food slice temperature reaches the boiling point and the moisture level begins to decrease. The slope of the line 322 depicts the first phase dehydration rate, which is 0.2 grams moisture per gram of solid per second in the embodiment shown. Once the potato slice reaches its starch melting point range 350, the dehydration rate slows. Consequently, the second dehydration rate phase 326 shown in FIG. 3 is 0.03 grams of moisture per gram of solid per second. The second phase dehydration rate is constant until the potato slice starch reaches the glass transition stage 360 and passes into phase 3. In the phase 3 dehydration stage 330, the temperature of the food slice increases to impart desired flavor notes. The exact temperature increase and profile will depend on the level of pre-applied oil as well as other drying energy factors.

A rise in the product temperature represents a change in absorption of the microwave energy away from water during the latter drying stage. Product drying can be stopped just prior to temperatures rising rapidly toward the end of the drying cycle when microwave energy heats organic matter of the substrate directly rather than water. The exact temperature profile will be in part dependent on product formulation and can be determined by trial and error and then set as a process control parameter. Consequently, in one embodiment, the potato slice is removed from the heating stage 330 when the potato slice reaches a certain temperature. By removing the product before a significant temperature rise occurs, the development of acrylamide can be minimized. In one embodiment, the food slices are removed from the microwave at some time after the slices reach a temperature of about 110° C. and preferably before reaching about 140° C. and optimally before reaching about 120° C. to minimize acrylamide formation. In one embodiment, the heating stage 330 occurs under vacuum to further minimize acrylamide formation. In one embodiment, the explosive dehydration step 200 occurs in a vacuum microwave. Such an embodiment advantageously reduces the temperature of the food slices during dehydration resulting in lowered levels of acrylamide. Those skilled in the art will recognize that by operating under vacuum, the temperature and moisture parameters of the starch conversion are modified and this can be used to further manipulate finished product texture. Therefore, in one embodiment, all or a portion of the microwave dehydration occurs under a vacuum where the vacuum level is selected according the finished product texture desired. In one embodiment, the microwave comprises a micro vacuum of between about 20 to about 80 torr where the boiling point of water is less than about 46° C. or a high vacuum of between about 150 to about 250 ton where moisture boiling point is between about 60° C. and about 70° C. In one embodiment, the vacuum may be released or partially released towards the end of the drying cycle to encourage flavor development in the crisp. Alternatively, a low vacuum of about 500 to about 700 torr where moisture boiling point is between about 90° C. and about 98° C. may be applied to slightly lower product temperatures while minimizing the risk of ionizing a rarefied atmosphere containing microwave energy. In one embodiment the vacuum level is increased towards the end of the drying cycle to avoid exposing heat sensitive food materials to excessive temperature when moisture contents are low and therefore to minimize acrylamide formation. Of course the requisite vacuum level can depend on one or more factors including the food substrate material, desired degree of puffing, microwave power, food substrate shape, etc. Consequently, the vacuum can range from 0 to about 760 torr.

It should be noted that the specific dehydration rates depicted for three dehydration phases shown in FIG. 3 merely depict one embodiment of the present invention. The actual drying slopes can be controlled to simulate frying based upon the power provided by a microwave, the design of the applicator and the composition of the food slice.

Table 1 below depicts the dehydration rates for the three phases for a single cavity (applicator), continuous belt, multimode microwave run at two different power levels. Such information is provided for purposes of illustration and not limitation. The claims scope of the present invention applies to any microwave system where energy is absorbed by a food slice in the microwave field and not limited by design specifics such as number, location, design or orientation of waveguide inputs; microwave frequency; number of modes; shape of cavity (applicator) etc.

The microwave heating chamber used to generate the information depicted in Table 1 contained on average 39 potato slices (Saturna), dry mass equivalent of about 35 grams, at any instant. At the microwave generator's dial power setting (Pf) of 6 ("Medium" power in this example), to achieve drying rates of about 0.2, 0.03 and 0.004 grams moisture per gram dry mass per second over the drying times shown in FIG. 3 required absorbed microwave powers of about 2.6, about 0.8, and about 0.2 kW respectively (3.5 kW in total). Therefore, the absorbed power distribution for Phase 1, Phase 2 and Phase 3, is about 73%, about 23% and about 4% of the total absorbed power respectively. Similarly at a power setting of 3 ("Low" power in this example) the drying rates of about 0.065, about 0.01 and about 0.001 shown in FIG. 4 (discussed below) required absorbed microwave powers of about 1.3, about 0.2, and about 0.04 kW (about 84%, about 13% and about 4%) respectively (1.5 kW in total). These numbers provide a guide, to one skilled in the art, to the power distribution required in the microwave drying process (explosive drying) in this worked example. However, these values are specific to the pilot process (microwave cavity and power source) in use and should be set to ensure the absorbed power delivers the desired drying rate quoted in grams moisture per gram dry mass per sec for which ever cavity is in use.

Since the actual energy absorbed is a function of cavity design and product, the efficiency of a specific microwave system must be known to set the relevant forward power. In this case, assuming a coupling efficiency of about 70%, the "Medium" power setting of 6 corresponds to power available in the cavity of 5 kW, and the "Low" power setting of 3 corresponds to power available in the cavity of 2 kW. In both cases, reflected power was around 1 kW, corresponding to the actual forward power setting used in the experiments of 6 kW and 3 kW for the power settings of 6 and 3 respectively.

TABLE 1

Drying rates (grams moisture to grams dry mass per second)
Potato Slice Dehydration Rate Examples
to Match Continuous Frying of Regular PC

|  | Power Setting = 6 (Figure 3) | Power Setting = 3 (Figure 4) |
| --- | --- | --- |
| Phase 1 | 0.2 | 0.065 |
| Phase 2 | 0.03 | 0.01 |
| Phase 3 | 0.004 | 0.001 |

While not being limited by theory, the inventors recognize that phase 1 and phase 2 appear to be responsible for mimicking the texture generated by frying using the disclosed non-oil drying method. Phase 1 corresponds to the evaporation of a large amount of water. In phase 1, drying rates are highest and the inventors have observed these drying rates are often similar between "different" food slices (e.g. raw slices and dough slices of similar starting moistures) for a given set of microwave conditions. This is most likely due to the 'free' nature of the moisture being removed in this phase. Phase 2 relates to a significant starch transition during which time the native starch is thought to be in a molten state since this is known to occur at about 50% moisture (1 g water per g of starch solids dry basis) at 100 C. Starch melting is traditionally slow in kettle fryers and quick in continuous fryers so that the resultant texture varies from crunchy to crisp. Without being limited by theory, it is possible that in phase 2, the drying rate may be dependant on the nature of the food slice as well as the drying energy applied since diffusion-limiting factors may be expected to be more influential on water transport than in phase 1. In phase 3, the starch, and therefore texture has set, so phase 3 primarily influences the finished crisp flavor and color and also facilitates equilibration of the moisture distribution within and between food slices.

With the knowledge that drying profiles can be divided into three distinct phases and an understanding that these phases influence the finished product in different ways, a drying profile can be determined that manipulates the product texture and flavor in a similar way to changing the profile of a fryer today from continuous to kettle. For example, to achieve a kettle like texture, energy input is reduced in phase 2 to simulate the longer carbohydrate transition period associated with the slower starch melting that occurs in kettle crisp fryers. Effectively, a microwave can be tuned to deliver the same effects as a fryer—using energy transfer to replicate conductive heat transfer without the use of oil.

In one embodiment, the continuous microwave cavity is divided into multiple continuous cavities through a series of chokes or baffles. By selecting appropriate positions for each choke device, the microwave energy input can be independently controlled at each point along the drying curve. This enables the user to specify and control to different drying rates during each phase, or if desired within a phase. Therefore, the drying rate of phase 2 could be reduced as above for 'kettle' texture or could, for example, be increased to match that of phase 1 in order to reduce the overall drying time while the drying rate in phase 3 may, for example, be decreased in order to confer a broader control window over the food slice moisture and temperature exit conditions. In a preferred embodiment the phase 1 and phase 2 drying rates are controlled independently from phase 3 by using microwave cavities that are fully separated by means of a microwave choke. Although similar in residence time, when simulating a fryer, the power requirements of these two cavities are differ by the order 20:1 for R1/R2:R3. Instrumentation to monitor temperature, moisture content and other parameters may be used at the exit of the R1/R2 cavity and, optionally, the R3 cavity as part of a product quality control and process safety strategy. This situation may be further enabled by use of a product transfer conveyor between microwave cavities or microwave and other unit operations. Although drying can be achieved in a single open microwave cavity, separating the microwave drying stages conveys an advantage to the processors control over final chip flavour, particularly when making controlled oil potato chips. Moisture content can be reduced in a controlled manner to 3% to 7%, in the R3 cavity, which significantly reduces the time required in the finish dry stage 300. Since the finish dry typically comprises hot air, this reduces the exposure of the chip to oxidative reactions and may cut the finish dry time from as much as 40 minutes to as little as 5 minutes.

An alternative embodiment uses batch microwave drying in place of continuous microwave drying. Those skilled in the art will be familiar with domestic microwaves that operate on a batch basis with either a continuous or pulsed power input. By way of reference, a typical domestic oven has been measured to have a phase 1 drying rate 10 times slower than the example given for the medium power setting of 6 in table 1 above and a total drying time, approximately 4 times as long. As outlined above, this method will deliver a harder product texture and will create more challenging control conditions to remove the product at an equilibrated, consistent moisture content at the end of the drying cycle since the power input remains constant even when moisture is low towards the end of the drying cycle.

Therefore, in one embodiment, a batch microwave is used with the power input adjusted over the time of the drying cycle to simulate the energy profile of a continuous drying system. By way of example but not limitation, for the Pf=6 example given in table 1 above, the power input (which is determined by product load and cavity design) would be reduced at a time that coincides with the start of each phase so that phase 1 received about 73%, phase 2 received about 23% and phase 3 received about 4% of total energy required for drying. The power profile can be tailored to deliver the desired product and most economic drying conditions for the food slice taking into account that hot air addition and vapor extraction may also be used to assist the drying process. In one embodiment, the principle of controlling power input over time for batch drying is applied when operating the microwave chamber under vacuum as described above.

FIG. 4 is another graphical representation of the dehydration rate of a plurality of potato slices in accordance with one embodiment of the present invention. The microwave power energy input per kg that produced the data for FIG. 4 was lower than the power used to produce the data in FIG. 3. As shown in FIG. 4, there are three distinct drying phases that have a high linear correlation. The first phase dehydration rate 422 is about 0.065 grams moisture per gram of solid per second. The second phase dehydration rate 426 is about 0.01 grams moisture per gram of solid per second. The phase 1 and phase 2 drying rates appear to be proportionally related when presented for continuous drying in a uniform microwave field. The third phase 430 comprises a dehydration rate of about 0.001 grams water per gram of solid per second.

Figure 5:
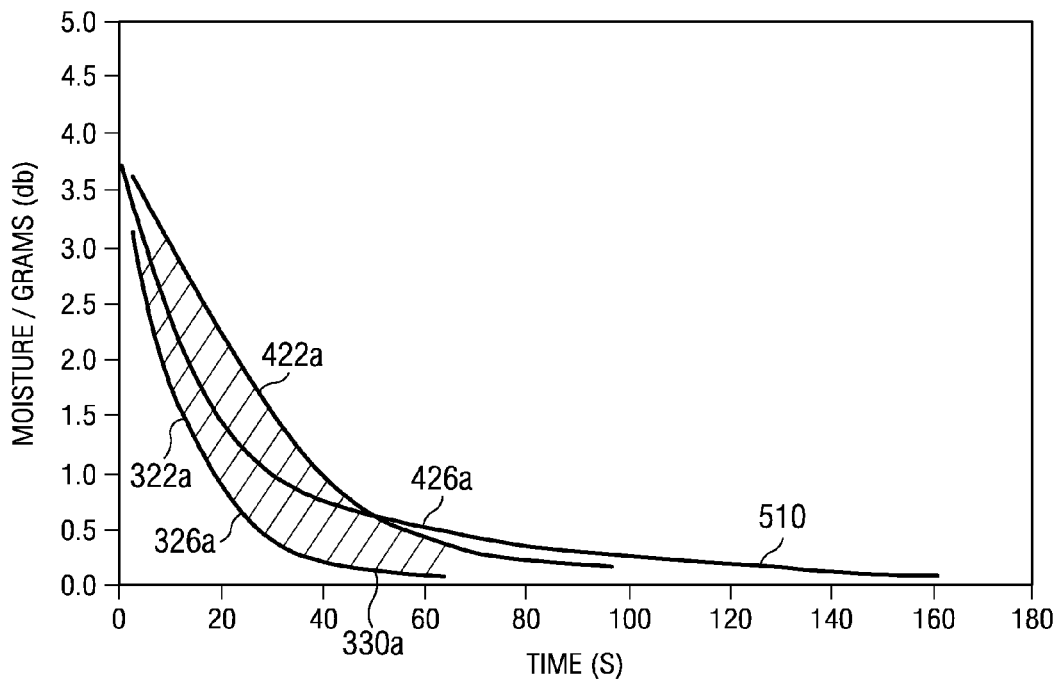
FIG. 5 is an approximate comparative graphical representation of the data depicted in FIG. 3 and FIG. 4.

FIG. 5 is an approximate, comparative graphical representation of the data depicted in FIG. 3 and FIG. 4. The lower line 322a, 326a, and 330a and upper line 422a, 426a define the drying rate window in which the target texture was reproduced for the potato crisp product being studied. Because the lines depicting the dehydration rates in FIG. 3 and FIG. 4 have been curve fit, the upper and lower lines are approximate. As a result, the numerals have the letter "a" associated to indicate the slight variation.

As shown, the first dehydration rate 322a, second dehydration rate 326a and third dehydration rate 330a from a microwave oven operating at a power rate required to achieve the depicted dehydration rates 322a, 326a form a lower boundary. Similarly, the first dehydration rate 422a, and second dehydration rate 426a from a microwave oven operating at a power rate to achieve the depicted dehydration rates 422a, 426a determine an upper boundary. It is the shaded area between these two boundaries that corresponds to a region that mimics the dehydration profile 510 of a continuous deep-fried thinly sliced, flat cut potato crisp. Consequently, in accordance with one embodiment of the present invention, a food slice dehydration profile that delivers texture and organoleptic properties similar to its fried counterpart but occurring in a non-oil medium, lies in the shaded region.

In summary, the study of microwave drying of food slices has revealed three different drying phases that appear to be marked by the starch transition point, the melting point and the glass point. In phase 1 the drying rates are highest prior to the starch melting and 'unbound' water is substantially removed. The faster this moisture is removed the more porous the slice surface is expected to be and the fewer the final number of blisters. In phase 2 the drying rates are intermediate post-starch melting and the rate at which the food slice transitions through this phase influences how the texture is set in the final snack. In phase 3 the drying rates are lowest post starch glass transition. In phase 3, the flavor and color is developed and moisture is equilibrated. Cooked potato and fried flavor notes are imparted, particularly when oil is present on the food slice and the oil and food slice are heated through microwave power coupling preferentially with the oil at lower moisture contents and some added steam heating present during this final moisture evaporation stage. This results in a relatively higher exit temperature but more controllable product and process conditions at the end of the microwave drying step.

One important benefit of the present invention is that the rate of microwave drying can influence the product texture. Consequently, with knowledge of the carbohydrate transition points, which is easily determined using a belt-driven microwave cavity, a dehydration profile can be determined that manipulates the product texture as desired. Acceptable snack products can be made from food slices comprising fresh raw materials in primary or explosive drying times from about 30 seconds to over 12 minutes. Longer drying times (specifically a longer time in phase 1 and 2) create slightly harder and glassier textures similar to batch kettle fried hard bite potato crisps. For example, to achieve a kettle-like texture, energy input can be reduced in phase 2 to simulate the slower starch melting phase that occurs in the kettle crisp fryers today. Faster drying times (specifically a shorter time in phase 1 and 2) create more light and crisp textures similar to the fried snack foods made in continuous fryers of today. Effectively, a microwave can be tuned to deliver the same effects as a fryer and can thereby replicate heat transfer without the use of oil.

A further series of experiments were performed to quantify the preferred drying rates for each of the three phases when using a freshly prepared potato based food slices to make snackable foods. Potato slices in a raw slice form and were prepared using one of the blanching methods disclosed to give a native moisture content around 75% to 82% and a wet piece thickness of 1.4 mm. The summary of preferred rates is given in table 2 below.

TABLE 2

Drying rates by phase for potato based food slices: rates given are gram of moisture removed per second per gram of dry matter (dry basis);

| | more hard crunchy texture ← → | | more light, crisp texture |
|---|---|---|---|
| | Minimum Rate | Preferred Range for texture | Maximum Rate |
| Phase 1 | 0.02 | 0.06-0.18 | 0.20 |
| Phase 2 | 0.004 | 0.01-0.06 | 0.08 |
| | more pale, bland flavor ← → | | more cooked, bitter flavor |
| | Minimum Rate | Preferred Range for flavor | Maximum Rate |
| Phase 3 | 0.0005 | 0.002-0.02 | 0.03 |

In one embodiment, potato slices ranging from 1.0 mm up to 3.0 mm thick, but preferably 1.3 to 2.0 mm are processed using one of the combinations of drying rates disclosed above. In one embodiment potato based food slices in composite pellet form ranging from 1.0 mm up to 3.0 mm thick, but preferably 1.3 to 2.5 mm are processed using one of the combinations of drying rates disclosed above. As already described, each phase can be varied independently, in a continuous or batch process, between the maximum and minimum limits in table 2 to generate the desired flavor, texture and appearance product attributes in the finished food or to optimize the processing or engineering solution for the manufacturing equipment used. Therefore, in one embodiment, any combination of the above drying rates for each phase may be used to process a food slice.

A method has been devised using a microwave oven to simulate the non-oil cooking medium and accurately determine the drying rates for each phase in order to simulate a fried food product. This method is novel in its use of a microwave cavity to generate data that enables starch and carbohydrate transitions to be identified and for that information to be directly relevant and applicable to design a process that tailors the product attributes of a snack food to simulate its fried counterpart. While starch transitions are known to occur in normal frying processes, historically experimental noise associated with the methods for determining drying profiles have masked the ability to determine starch transitions with any accuracy. One advantage of Applicants' method is that it does not rely on specialized or complicated analytical equipment (e.g. Diffraction Scanning calorimetry) to determine the carbohydrate transition points but uses pilot or production scale processes typical of those found in applied manufacturing development facilities. A further advantage is that the method is capable of sufficient precision and accuracy to optimize product attributes and define the relevant process conditions and to use this information to design a large-scale production line that accurately reproduces a laboratory or pilot product at commercial scale. Since drying rates will be influenced by the degree of uniformity of the food product, its size, shape, recipe and composition, it is preferable to generate initial drying curves on a homogeneous base of the simplest geometry comprised of the primary carbohydrate with, optionally, a controlled amount of oil. Subsequent optimization of the process conditions can be carried out according to the final compositional and dimensional attributes of the product to be processed.

A single chamber, continuous conveyor microwave oven equipped with a side-opening panel that allows full belt access between inlet and outlet chokes is the preferred pilot experimental equipment. A unit was designed and constructed by C-TECH, Capenhurst, UK for this purpose. The equipment should be temperature equilibrated at a pre-determined, fixed power before use. Food slices are prepared and presented to the microwave oven in a uniform configuration of rows and columns. For improved accuracy food slices should be selected to be of similar size, shape, weight, moisture content and moisture distribution. For maximum piece-to-piece uniformity the food slices may be homogenized (for example, by ricing, grinding or milling) and then reformed into consistent pellets, optionally incorporating a mixture of ingredients to make a composite product if desired. Operating at fixed power the residence time of the food slices inside the heating cavity of the microwave can be adjusted to achieve the selected exit targets e.g. moisture content, color, hardness or texture. When the process achieves steady state continuous running, the conveyor belt and microwave power are simultaneously stopped at the point where a full food slice has just fully entered the heating chamber. The cavity is opened and samples are removed at each point along the belt for laboratory moisture analysis. Each point along the belt is assigned a time value based on the operating conditions used for the test. Typically, six replicates of this experiment per food product per process conditions produce sufficiently precise experimental results. Optionally, during this experiment the temperature profile may also be measured.

A knowledge of the temperature and moisture content of starch or a carbohydrate can assist in predicting transition points with reference to scientific literature or can be used to influence and control the chemical reactions that occur in the food product during processing. When the method disclosed is used to study chemical reactions in food products additional functionality such as hot air for ambient temperature control or an instant reaction quenching method (for example, cold carbon dioxide gas) may be added to the appropriate stage of the microwave oven chamber.

The percentage moisture loss determined over time by laboratory analysis is converted to a dry basis rate of moisture loss. Dry basis moisture loss makes any transitions in drying rates more obvious. The product or process developer can then apply linear regressions to obtain the best-fit lines and therefore drying rates per phase. The product developer can expect to achieve linear correlations with $r^2>0.8$ and typically $r^2>0.9$ with the potential for phase 1 and 2 to approach $r^2=1.0$ for precisely orchestrated experiments. For a potato based food slice dried to less than 10% moisture two transitions and three drying phases may be determined. By way of example only, potato starch transition points may nominally be expected at the end of phase 1 at dry basis moisture content around 0.8 to 1.2 but typically around 1.0 (50% water) for native potato slices and end of phase 2 at dry basis moisture contents between 0.10 and 0.50 but typically around 0.25 (20% water) for native potato slices. For this method, the drying process may be considered complete at dry basis moisture of 0.05 (around 5% water content) In this case, the moisture content refers to the average moisture content for the food slice noting that due to the nature of drying processes the food slice may contain a moisture gradient.

Through iterative study or process, manipulation of these drying phases will enable the sensory properties of a fried and other food products to be closely simulated in order to obtain a desired end product. Sensory properties can be evaluated using well known consensus or blind panel techniques. Where basic cooking parameters (moisture, time) are known, this information can be used to reduce the number of iterations. Alternatively, if a full dehydration curve of sufficient accuracy is known or can be determined for the food product and process under investigation, this can be quantified and accurately simulated by determining the microwave power required to match the water removal rates of the cooking system used, thus reducing iterations.

A belted or rotary microwave can be used for the explosive dehydration step 200. A belted microwave known from frozen meat and fish applications and available commercially from Ferrite, Inc. of Nashua, N.H., USA can be used. Belted microwaves either as single or multiple cavities are most suited to food slices that are molded, sheeted, extruded, stamped or otherwise deposited in an orderly manner onto a moving belt. Belted cavities have been presented in the prior art to manufacture potato chips (U.S. Pat. No.s 5,292,540 or 5,298,707) but are not generally suited to natural food slices that are presented in a random manner, both in orientation and piece size, as happens for example with sliced potato or other tubers. In these cases, small piece sizes must be selected out from the incoming or outgoing product stream due to improper drying and specialized horizontal slicing that deposits slices as individual pieces mono layered onto a moving belt must be used. The disadvantage of this system is the relatively low belt loading that is achieved which drives large line footprints and poor processing efficiencies. A further disadvantage is the low throughputs that result from avoiding large line footprints and due to the poor capability of such slicing systems to maintain complete separation of each slice. Without complete slice separation, a starch based food slice is prone to ignition inside the belt microwave cavity caused by a concentration of microwave energy and sustained arcs in the area of close slice proximity or overlap between slices. Food slice ignition will seriously taint the product being manufactured, damage transport components and presents a dangerous fire hazard for the processor.

Rotary microwaves are most suited to food slices presented in a random manner to the explosive drying step 200 or where product sticking is not a concern. The applicants disclose a rotary microwave that can receive randomly presented natural food slices, for example potato slices from an Urschell CC slicer of the type most commonly used on potato chip lines today, without the need to deposit in a singular manner on a belt, to control or select piece size or shape, manage adjacency or to separate food slices into a single layer. Rotary microwaves are available in other industries such as the ceramics industry, as illustrated by U.S. Pat. No. 6,104,015 and for "microwave absorbent materials" as illustrated by U.S. Pat. No. 5,902,510 and can be constructed for use under vacuum as illustrated by U.S. Pat. No. 6,092,301 for tanning Rotary microwaves are not promoted for use in food products but can be used in this instance.

One advantage of using a rotary microwave is that food slices can fold as the slices dehydrate and transition from the rubbery state into the glassy state. As a result, the dehydrated slices have random folds thereby mimicking the appearance of traditionally fried snacks. Control over the formation of shape generated by tumbling action during deep bed rotary drying of the food slices can be enhanced by the use of the pre-drying methods disclosed earlier in this application. An important feature of rotary microwave drying is that it avoids the need to partially separate or singulate the food slices prior to explosive drying which is a complicated operation and normally required to ensure that randomly presented food slices do not stick together during drying on a belt. Therefore, a further advantage to a rotary microwave oven is that the food slices can be explosively dehydrated in a relatively dense deep bed configuration whilst being continuously agitated. The tumbling action maintains individual slice separation and avoids slices sticking together without requiring a large, uneconomic footprint that would be needed to keep the slices separated in a monolayered or partially mono-layered belt drying operation of typical industrial capacities. A further advantage of rotary drying is to induce a more familiar curled shape to the finished chip, similar to that found in conventionally potato and corn chips.

In one embodiment, a rotary microwave that is suitable for snack food applications is constructed in either batch or continuous form. In its simplest form, a rotating drum that will transport the food slices during drying is enclosed in an external cavity. The external cavity can be built to any geometry including, but not limited to square, triangular, pentagonal, hexagonal or parallelogram. A circular cavity confers the opportunity to minimize the volume of the system by accommodating a concentric product transport drum or acting as the rotating product transport drum itself. Food slices are fed into the cavity through a microwave choke equipped with a transport belt or vibrating conveyor and can be removed by similar means or by free fall through a suitable choke. Preferably the product is removed by gravity feed to a rotary vane discharge which allows product to be removed through a larger surface area, and thereby reduce the risk of slices not discharging effectively, than with a simple discharge pipe or chute when some of the vanes are designed to continuously choke microwave energy whilst discharging product between other vanes.

The rotating drum preferably contains longitudinal flights or other lifting structures to ensure the food slices are lifted and tumbled during transport. The number, profile, size, etc. of these flights has a major influence on the final product attributes especially product appearance attributes such as curl. The ratio of airborne time (or free-fall time) to drum contact time (when the food slice is being lifted by a flight) is a significant variable which has been found by the Applicants to influence food slice final appearance. To control food slice residence time distribution, the drum may also contain a spiral, helix or similar device along the entire length of the drum or part of the drum, for example the last half of the drum.

In alternative embodiments, other novel microwave designs may be utilized including, but not limited to, cavities that transport slices on helical conveyors, multi-pass conveyors, vertical trays, or accept free falling slices under gravity with or without counter air flows. In one embodiment, steam is added near the end of the drying cycle when the moisture content is low to assist in avoiding product scorching. Further, one or more additional mediums selected from temperature controlled air, steam, superheated steam, radio frequency, and infrared radiation can be used to assist the explosive dehydration and/or water removal in the microwave.

Delivering the desired drying rates can be achieved in a variety of different microwave applicators. Specialist applicators such as the meander apparatus for potato chip manufacture disclosed by Sprecher in U.S. Pat. No. 5,298,707 may achieve the target drying rates but present significant complexity when it comes to building a commercial scale system (typically 50 kg/hr and above). Therefore a multimode cavity is preferred for use at commercial scales for reasons including design simplicity, high power handling capability and relative cost. For example, The Ferrite Company Inc. (Nashua, USA—www.ferriteinc.com) sell bacon cooking lines based on multimode cavities measuring 1.3 m wide, 3.7 m long and 0.8 m high, with up to 150 kW microwave generator power at 915 MHz per cavity. These cavities may be installed in drying trains of, for example, six or more units.

Delivering the desired dehydration rates in food slices is possible in other applicator types such as monomode, slotted line, meander, fringing field, phase controlled (e.g. EP 792085), but these cavities do not deliver economic scalability as easily or as advantaged for snack food manufacture as with multimode.

For example, monomode applicators have width limitations (e.g. 15 cm at 896 MHz for WR975 waveguide), require a conveyor feed (therefore cannot tumble food slices) and the single high intensity mode may not deliver uniform heating for foodstuffs such as potato slices. In contrast, those skilled in the art will appreciate that various designs can be implemented within multimode applicators that will deliver effective and efficient drying of food slices and that well designed multimode oven cavities can be tailored to uniform drying of particular food slices.

Multimode oven cavities can be designed for uniformly presented and deposited food slices of even weight that are suitable for monolayer transport through a belted cavity. Equally multimode ovens can be designed for non-uniform, randomly presented food slices of variable weight (for example potato slices from an Urschell CC slicer) that are very difficult to singulate and monolayer for uniform presentation to the microwave field. In summary, multimode provides the greatest flexibility in designing a process to suit the product.

In the latter case, where it is complex or inefficient to effectively monolayer the food slices, multimode oven cavities can be built for deep bed transport of food slices, meaning the food slices are transported with continuous, controlled agitation in non-continuous non-intimate contact with each other, for example in a tumbling action. A cavity designed with this functionality maximizes the number of slices that can be transported in a given area which translates to higher throughput per area of plant and will minimize food slices sticking to each other, enables steam escape from both sides of the slice and can induce a more natural curl appearance to the finished chip. A further benefit is the reduced equipment footprint compared to an oven cavity that relies on monolayer, particularly of randomly presented food slices which causes belt loading to be particularly low to ensure no prolonged slice to slice contact that could lead to adhesion between slices during the drying step. Since the rotary microwave chamber can be divided into separate zones or independent cavities a high degree of control can be attained on the chip exit temperature and moisture values. The deep bed and low drying rate during the R3 period in the final rotary microwave cavity, ensures moisture equilibration between food slices and chips of 3% to 7% moisture can be consistently produced, which positively benefits final flavour and texture. Drying to lower moisture in a microwave chamber significantly reduces the time required in the finish dry stage 300 and therefore minimizes the risk of undesirable oxidative reactions. These are known to occur when processors air dry for extended time periods because it has previously been necessary to exit microwave dryers at higher moisture contents to avoid the snack product overheating and burning due to the limits of process design disclosed in prior art resulting in a mismatch between product load and microwave power.

Preferred methods to achieve deep bed transport through tumbling action have been categorized as rotary form microwaves and include, but are not limited to, using what Applicants refer to as Catenary Belt, Rotating Drum, and Rotating Cavity microwave ovens designs. Each of these designs is discussed below. Any of these rotary forms may contain combinations of longitudinal flights for lifting food slices and spirals for control of residence time distribution.

Figure 7:
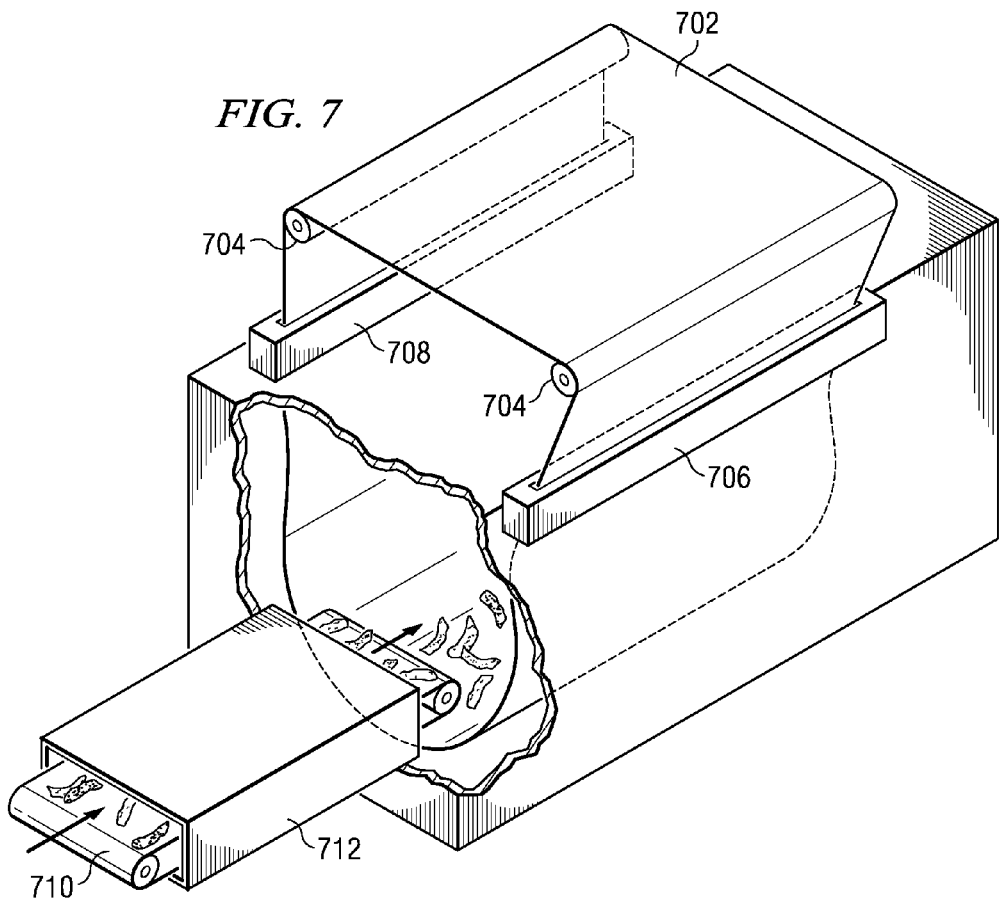
FIG. 7 is a schematic perspective representation of one embodiment of the catenary belt microwave described herein with a cutaway showing the interior of the microwave cavity.
Figure 8:
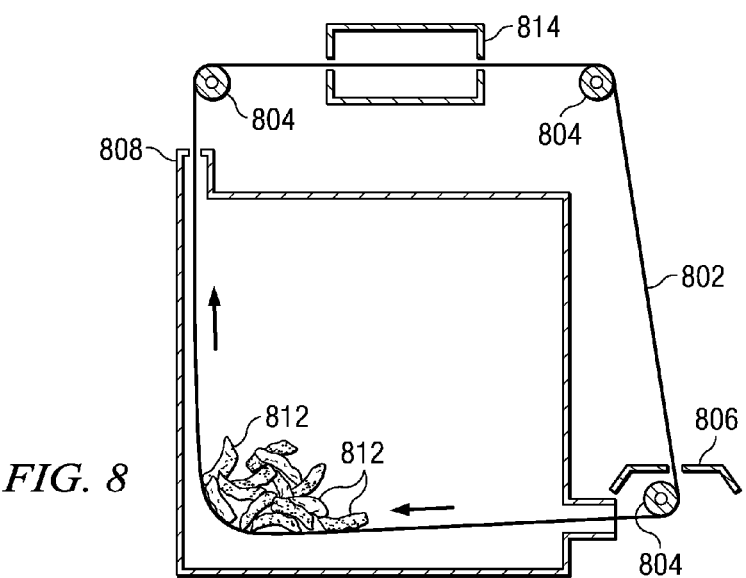
FIG. 8 is a schematic cross-section representation of an alternative embodiment of the catenary belt microwave described herein.

A Catenary Belt design is a static multimode cavity or enclosure with a modular polymer belt (for example Intralox) inclined a few degrees in the direction of product travel. Two different embodiments of the Catenary Belt design are shown in FIGS. 7 and 8. FIG. 7 is a schematic perspective representation of a Catenary Belt microwave unit wherein the belt 702 enters the microwave cavity (the "enclosure") at a microwave choke 706 located at the top of the unit. FIG. 8, on the other hand, is a cross-section view of an embodiment wherein the belt 802 enters the microwave cavity through a choke 806 located near the bottom of the unit.

Referring to FIG. 7, the modular belt 702 (also referred to by Applicants to reflect this embodiment as the "Catenary Belt") is routed over two rollers 704, at least one of which is a drive roller which drives the modular belt 702 into the microwave cavity. The modular belt 702 enters the microwave cavity through a microwave choke 706. Product enters the microwave cavity by virtue of a conveyor 710 through a microwave choke 712. Although not shown in the drawing, product exits the unit through a similar conveyor and microwave choke at the rear of the unit. The modular belt 702 exits the microwave cavity though another microwave choke 708 located at the top of the unit. This particular unit would also have some type of belt cleaning apparatus, usually situated between the two rollers 704, but is not illustrated in FIG. 7.

Referring to the cross-section view shown in FIG. 8 of a second embodiment, again the modular belt 802 is routed over at least two, and in this instance three, rollers 804, with at least one of them being a drive roller. The modular belt 802 enters the static microwave cavity or enclosure through a microwave choke 806 near the base of the unit. Product 812 can be seen tumbling on one corner of the modular belt 802 in a deep bed configuration. This tumbling is induced as the belt travels towards an exit microwave choke 808. Also depicted in FIG. 8 is a belt cleaning unit 814.

The belt loci within the cavity in a Catenary Belt design effectively simulate the quadrant of food slice contact surface formed by a rotary drum. Modular belts are advantaged because they can be made to form effective radii or arcs by control of the size of their catenary sag, construction of individual belt segments, external drive locations and feed points through the microwave cavity. The advantage of this design is to drive the belt 702, 802 externally to the cavity and to ensure that no polymer part remains within the cavity for more than a few seconds, which therefore enables continuous in-line belt cleaning to remove build-up of product debris and dielectric coatings deposited from the food slices.

A Rotating Drum design is a static multimode cavity with a rotating drum inclined a few degrees in the direction of product travel enclosed therein. The drum is constructed at least in part of microwave transparent materials and configured to allow water vapour to escape at required rates for example using perforated drum walls and/or effective air flow allow the food slices therein contained to be heated directly by microwave energy and for steam to escape. Similarly, if spirals are used within the drum, preferably the spirals are made from microwave transparent materials and are perforated to reduce risk of slices sticking and to allow steam to effectively escape. The drum can be mounted on a drive system internal to the cavity/enclosure or can be suspended in the cavity/enclosure and driven from outside the cavity/enclosure via the suspension mechanism.

A Rotating Cavity design is a multimode cavity that acts to both contain the microwave field and to transport the product. The cavity/enclosure is mounted on an external drive system, similar to rotary hot air dryers known within industry, and preferably the whole cavity/enclosure is rotated between static end plates to avoid the need for rotary chokes on each individual waveguide feed, product transport infeed, product discharge, air inlet and steam extract ducts etc. Alternately, at least one end plate is static to house waveguide feeds, product transport infeed and discharge, air inlet and steam extract ducts. Thus, this embodiment comprises a rotating enclosure, as opposed to the static enclosures of the two previous design examples.

Figure 9:
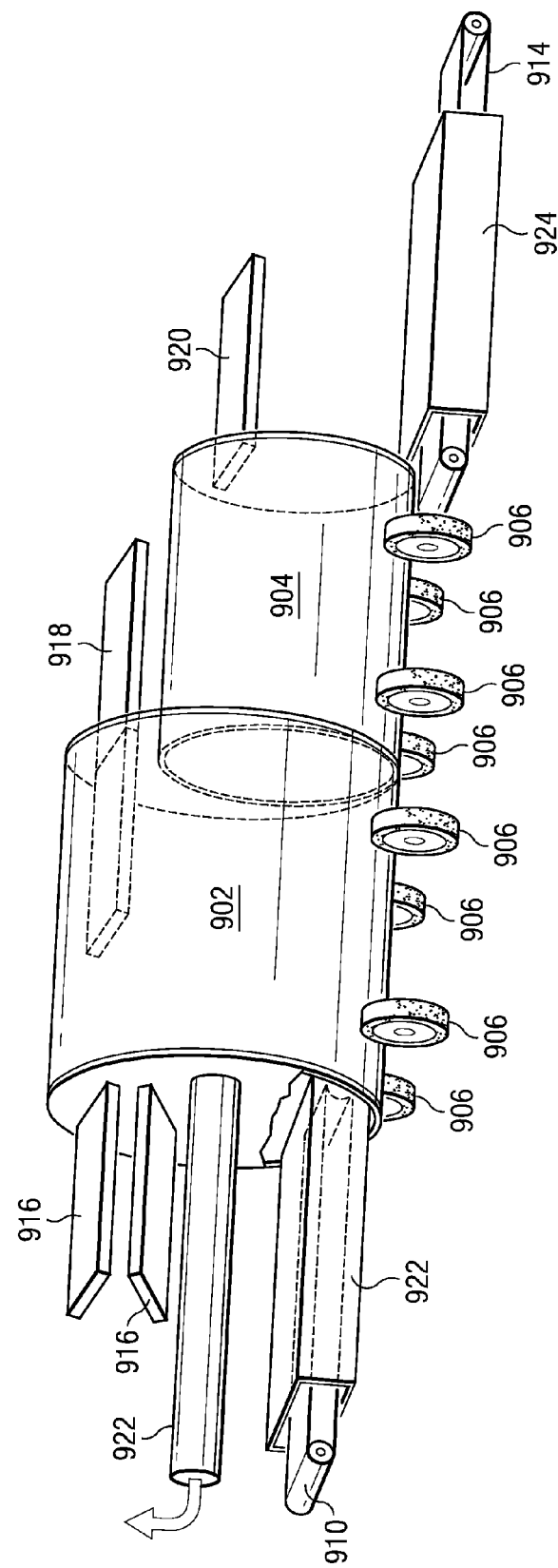
FIG. 9 is a schematic perspective representation of the rotating cavity microwave oven described herein.

FIG. 9 is an illustration of a two-cavity embodiment of the Rotating Cavity microwave unit. This unit comprises a first cavity/enclosure 902 and a second cavity/enclosure 904 that both rotate on, and are driven by, drive wheels 906 that are external to each of the cavities 902, 904. One or more wave guide feeds 916, at different orientations, can be used to control cross-talk between microwave signals. One or more microwave feeds 918 can penetrate into the cavity as well, to allow more controlled delivery of microwave energy. In a preferred embodiment, a duct 922 communicates with the cavities in order to facilitate hot air feed and/or steam extraction. This duct 922, in a preferred embodiment, is a polymer sleeve insert. At least one separate wave guide feed 920 provides microwave energy specific to the second cylinder 904. In one embodiment, the two rotating microwave cavities are separate and joined only be a product transport conveyor to ensure complete control over the microwave power levels applied to each chamber. An end-feed conveyor 910 routed through a microwave choke 922 is used to introduce product into the first cavity. As the cylinders 902, 904 rotate and tumble the product within the cavity, a slight incline on the entire unit causes a gravity feed of the product from the first cylinder 902 into the second cylinder 904. Product is then removed from the second cylinder 904 by another conveyor 914 that also passes through a microwave choke 924. In one embodiment the microwave choke and product release at the exit of the chamber is accomplished by the use of a rotating vane or valve with several pockets.

It should be noted that full microwave drying can be completed in a single rotary microwave form (Rotary Drum, Rotary Cavity, or Catenary Belt Design) if for example the product transfer between 2 or more cavities has a negative impact on the finished product attributes. Additionally, a single flatbed microwave dryer with linear conveyor can be used for the explosive drying step 200 if the food slices can be monolayered and separated by around at least 5 mm from other slices.

Each rotary microwave form design (Catenary Belt, Rotating Drum, and Rotating Cavity) benefits from longitudinal flights to lift and tumble the product slices on the walls of the drum, cavity or belt. While this is sufficient to control the tumbling action and transport of the food slices, additional features may also be added, for example an internal spiral or helix of fixed or variable pitch in a rotating cavity or drum can improve control of residence time, along the full length or part length of the drum or cavity. For example the Applicants have found that in a Rotary Drum with longitudinal flights, adding a spiral in the last half of the drum significantly improved residence time distribution and especially reduced the number of "flyers" (slices which travel too quickly through the drum and without substantially complete drying). The design of the spiral, flights and drum is critical to ensure substantially no risk of slices being trapped within the drum and becoming a fire hazard. Any of the designs may be configured as singlezone or multizone drying trains and the drying efficiency of any of the microwave ovens may be assisted by hot air, steam, superheated steam, infrared or other methods of heat and energy transfer.

Each design has different advantages and challenges when considered for commercial production. Static cavities, such as is found in the Catenary Belt embodiment and the Rotating Drum embodiment, allow power feed locations to be selected over a very large area of the cavity and preferred feed arrangements are well known in the art. This is important for large-scale installations that may draw 1 MW or more per cavity. Rotary cavities restrict the area available for microwave power inputs. The static end plates provide the greatest area but present additional design complexity, for example: avoidance of cross-coupling of microwave fields between multiple feeds in close proximity, mechanical design to allow the static end plate to act as a door to allow personnel access to the cavity for cleaning, maintenance etc.

On the other hand, a Rotating Drum stays within a static cavity during processing and will be subjected to high temperatures (typically 100° C. and over) from contact with the hot food slices, steam generated by the food slices, and possibly externally applied hot air and/or steam to aid the drying process. Additionally the drum can become coated with dielectric materials (for example oil, starch, sugar, salt etc.) picked up from contact with the food slice. The drum is made at least in part from microwave transparent components for which polymer is typically used for reasons including mechanical performance, microwave transparency, cost and ability to be machined to desired form. When polymer inside a microwave field becomes coated with dielectric materials, there is a significant risk that the coating will self-heat leading to damage or melting of the polymer, which is more likely with the high microwave power densities required to achieve the initial drying rates disclosed herein than in conventional microwave drying processes such as bacon drying. To minimize the risk of damage to polymer parts within the microwave cavity, the polymer must be thoroughly cleaned on timescales typically more frequent than traditional food production cleaning schedules would ideally allow (for example daily rather than weekly in snacks manufacture). One way to improve this situation is to use a Catenary Belt running through a static cavity, which enables a polymer transport construction to be used in the microwave field while also providing the opportunity for continuous cleaning, which considerably reduces the risk of damage to the polymer.

A Rotating Cavity overcomes the disadvantages of having to use microwave transparent materials or polymers inside the microwave oven cavity and eliminates any complex internal architecture that may be needed to support, drive or remove drums or belts for cleaning and maintenance. While it is possible to construct a rotating cavity with non-metallic linings such as polymer, glass or ceramics to minimize or fully eliminate sticking of food slices to the cavity walls and those linings can have surface finishes applied to reduce effective surface contact area, the preferred embodiment of the rotating cavity design uses the metal walls to tumble slices and therefore eliminates maintenance, sanitation and cleaning issues associated with the lining. The effective contact surface area between wall and food slice can be reduced using textured finishes such as dimples or grooves, or applying holes or slots in the food slice contact metal surface itself in order to make the metal surface of the rotary drum less sticky to food slices. A suitable Rotating Cavity material is stainless steel 6WL provided by RIMEX, although other microwave reflective materials may be used including but not limited to metals such as Aluminum. The preferred embodiment is for such surface to comprise a non-stick metal surface. The food slices are tumbled in the microwave field by the rotating action of the cavity and longitudinal flights. The cavity can be rotated using drives external to the microwave field.

A preferred means of avoiding or reducing food slices sticking to contact surfaces is to use a metal or non-metallic air knife within the cavity to blow stuck food slices off. Preferably the air knife uses pre-heated air to avoid significantly cooling the food slices, assist with water removal from the food slice and/or assist with water removal from the cavity. Substantially Oxygen-free gases can be used in the air knife such as Nitrogen to reduce oil related oxidation reactions. Preferably the gas temperature is between 30 and 100° C. and with impingement velocities exceeding about 20 m/s at the food slice contact surface. An advantage of a perforated cavity wall is that an external air knife could be used instead of an internal air knife to blow stuck food slices off the food contact surface whilst avoiding undesirable interactions of for example a metallic air knife with the microwave field, and avoiding slices trapping on the air knife as they tumble.

The Applicants have found that it may be necessary when explosively drying food slices in a Rotary Cavity, to include non-metallic food contact surface linings made from microwave-transparent materials for example polymer, glass or ceramic to ensure the food slices couple the microwave energy at sufficient intensity and/or continuously to ensure explosive drying occurs. Such linings can have surface finishes to reduce sticking. The thickness of the lining can be chosen to be a function of for example the lining dielectric properties and the microwave operating frequency to encourage a field maxima to be coincident at the lining food contact surface so that the food slice heating rate is maximized at this location, or a minimum at the lining food contact surface so that self-heating of the lining or heating of oil or starch or other materials coating the lining is minimized.

A disadvantage of rotary cavities is the complexity of the rotary jointed choke that is required between the rotating cylinder and static end plates. Static end plates are preferred to facilitate ingress and egress of food slices on linear conveyors, microwave power via rigid waveguides and hot air and/or steam via conventional pipe work.

As shown in FIG. 9, multiple cavities may be placed in series to create a multizone dryer as described earlier in relation to the 3 phase drying curve. It should be understood that a multizone dryer can be created from both multiple rotating cavities, and multiple static cavities, or a combination thereof or by combining linear, belted cavities with a rotary form (cavity, drum or catenary design). One cavity may be used for a selected part of the drying curve only, for example half of phase one, phase one only, or phase one and two together. In one embodiment, multiple cavities may be used for the first phase where power requirements are highest. Advantages have already been cited for multizone configurations using more than one microwave cavity, including improved control of power distribution, power tuning and consistency of final product since the microwave cavity can be sized to the intended product loading, dielectric properties or other drying characteristics. It will be appreciated by those skilled in the art that there are many approaches to construct multiple multimode cavities, for example, by baffling or otherwise partitioning a large single multimode cavity into two or more zones. The degree of isolation required between baffled zones within a single multimode cavity or multiple rotating multimode cavities (which are linked by rotary jointed chokes and not internally choked) or combinations thereof may be high (e.g. 20 dB or more) to generate the drying rates required to achieve the preferred product attributes, or low (e.g. around 10 dB) if a single drying rate zone is split up into multiple cavities to assist power delivery. Alternatively, the static and/or rotary single or multiple multimode cavity(s) may be used without isolation such that the selected drying conditions (e.g., water removal rate, moisture content entering and exiting microwave cavity) determine the preferred drying curve.

Baffling may be preferred where multiple static cavities are used in order to minimize product transfer distances through full chokes, which may occur at critical points in the drying curve. While baffles can be inserted between sections of rotating drums or rotating cavities, rotating cavities with no other microwave containment also require a rotary choke between rotary chambers. Such rotary jointed chokes are well known, for example in radar applications, but are novel in this application since they have not been used for rotary cavities of diameters up to around 3 m that are suitable for handling commercial scale snack production volumes. A notable advantage of rotary chokes is the avoidance of large transfer zones, which may for example occur through discharge chokes, outlet conveyors and inlet conveyors between static multimode cavities. Such transfers can create opportunities for food slices to be inadvertently held up in the microwave field. The rotary choke itself may only be a few centimeters wide and the product flow across the choke acts to clear slices should any become held up.

An important design consideration for tumbling of food slices (whether by drum, rotating cavity or modular belt) is the balance between inertial and gravitational forces to achieve sufficient non-intimate contact with minimal physical damage. Trivial cases are when rotational speeds are too high, food slices will stick to the contact surface through centrifugal forces; if the rotational speed is too low, food slices will slide against the contact surface. Suitable conditions for delivery of preferred product attributes depend largely on drum diameter (or effective diameter if the modular belt design previously described is used) and rpm. Additionally, use of longitudinal flights, weirs, spirals or other devices which assist the tumbling action of the food slices have a significant impact on delivery of preferred product attributes. One useful approach to maintain optimum tumbling conditions (during scale-up or when using multiple rotating cavities of different diameters) is use of rpm, circumferential speed and the Froude number. The Froude number (Fr) is a non-dimensional scale-up parameter defined as $N^2 D/g$ for rotating drums, where N is drum rpm, D is the diameter (m) and g is gravity (m/s$^2$).

Referring back to FIG. 1, after the explosive dehydration step 200, the slices can be finish dried 300 to a moisture content of less than about 3% by weight of potato solids in the finished chip. A hot air dryer having a belt configuration operating at about 80° C. to about 140° C. or other suitable methods can be used alone or in combination. Other suitable finish drying 300 methods include one or more drying methods selected from hot air, infrared, radio frequency, and microwave. The slices can optionally be salted or seasoned 400 by methods well known in the art. An oil spray step can be used after the finish dry step 300 either before or in conjunction with the seasoning step 400 to tailor the final oil content and assist with seasoning adhesion.

The above unit operation examples are provided by way of illustration and not by way of limitation. Further, those skilled in the art will appreciate that many of the processes discussed with the potato slice embodiment above can be used with other food slices, including, but not limited to, beets, beans, carrots, bananas, apples, strawberries, lentils, wheat, rice, parsnips, Jerusalem artichokes, potatoes, noble nuts, peanuts and coated peanuts, masa, and corn. Starchy tubers are especially preferred. Further, those skilled in the art will recognize that if processing steps are applied to other raw foods besides potatoes, such foods may require processing times and temperatures different than those disclosed. However, such embodiments are intended to be covered by the claims scope of the present invention.

Doughs, in accordance with the present invention, can comprise entirely fresh or frozen raw materials or a mixture of fresh, frozen and dried raw materials such as native or modified starches. In a preferred embodiment the fresh, frozen or dried raw materials are selected from a natural vegetable source.

Additional ingredients including, but not limited to, seasoning, oil, nuts, seeds, pulses, and other inclusions such as fresh or dried herbs and spices may also be added to a dough. One advantage of the invention is that relatively fragile dough, for example with high moisture contents, for example from 65% to 85%, that may not be sufficiently cohesive for frying can be processed and dried using the continuous belt microwave or batch microwave embodiments of this invention. A dough with a high moisture content will occur in, for example, the manufacture of a vegetable chip from natural ingredients which have high native moisture contents. In a preferred embodiment, recipes are crafted to make exceptionally tasty vegetable chips using only real, non-artificial, food ingredients. The processing solutions disclosed enable these recipes to be converted to snack chips that meet or exceed the sophisticated nutritional criteria that is emerging in developed snacks markets for healthy eating while retaining a clean ingredient declaration in the finished product and delivering both an authentic real food taste and a clean fingered eating experience.

With the invention disclosed here, it is feasible to prepare food slices from any combination of up to 100% vegetables or other food ingredients. In a preferred embodiment, potato or another starchy tuber, for example sweet potato, swede, butternut squash or parsnip comprise at least one of the vegetable ingredients in a vegetable chip recipe. By way of example, a vegetable chip can be made from real food ingredients comprising potato and from 10% to 55% other vegetables and/or pulses and/or legumes or preferably potato and 15% to 30% other vegetables and/or pulses and/or legumes or more preferably potato and 20% to 25% other vegetables and/or pulses and/or legumes. The potato and other vegetables are cooked via conventional methods from fresh or frozen and then mashed or mixed to form a dough. The dough is preferably seasoned by adding natural ingredients selected from vegetables, herbs, spices, seeds and oils prior to forming a chip shape. In a preferred embodiment, oil is added the dough to give a vegetable chip with an oil content between 5% and 30% or preferably between around 10% and 25% or more preferably between 13% and 18% oil content. The wide range of oils that are suitable for this invention have previously been disclosed but are preferably selected from olive oil, sunflower oil, high or mid oleic sunflower oil, sesame oil, corn oil, cottonseed, rapeseed, nut and other seed oils. In addition, popular fats often found in culinary recipes may be included, for example butter. Some or all the ingredients may be prepared using culinary methods to enhance their flavour prior to inclusion in the dough. Culinary preparation methods include but are not limited to pan-frying, sautéing, caramelizing, smoking, roasting, marinating, slow cooking or mirepoix. In one embodiment soffritto, a method to sauté aromatic ingredients in cooking oil after which a great variety of vegetable ingredients may be added, is the preferred culinary preparation technique. Culinary preparation usually also includes size reduction, for example by using Julienne or Brunoise methods. Once formed and dried, the dough may optionally be lightly salted topically and/or optionally topically seasoned further with an infused oil.

A suitable dough may be prepared using familiar kitchen methods and domestic practice. For example, optionally peeling and then chopping potatoes and other vegetables ready for steam cooking on a stovetop. Once softened, a hand masher can be used to make the dough and optionally incorporate culinary ingredients, for example olive oil, roasted peppers, sautéed onion, salt and pepper or others as described above. A wide blade spatula or rolling pin can be used to form a thin sheet that is sufficiently consistent in the range of around 1 mm to 4 mm thickness from the dough from which shapes can be cut with a pastry cutter. Shapes can be lifted and placed into the non-oil drying apparatus using a spatula. The formed shapes can be placed on greaseproof paper that has been folded lengthways at intervals of around 5 mm to create a multitude of crenellations on which to rest the food slice for non-oil drying. While domestic non-oil drying or baking methods are suitable for drying this product, those skilled in the art should understand that the preferred drying rates disclosed are a requirement for the optimal, shelf stable snack product quality and are typically out of the achievable range of domestic non-oil drying equipment, for example domestic microwave ovens.

A commercial process may follow the steps disclosed here. Commercial scale processing solutions to cook fresh or frozen materials in preparation for making a sheet or dough are known from the prior art and current industrial practice in, for example, the potato flaking industry. Typically the process involves peeling and size reduction, for example by chopping potatoes in half, dicing or slabbing, followed by steam or water cooking Many equipment manufacturers including Heat and Control or Kronen supply suitable peeling equipment. Kronen, amongst others, also supply suitable size reduction equipment for example the KUJ 3D Dicer/Slabber, which enables whole potatoes to be reduced to slabs around 20 to 25 mm thick. This is a preferred size reduction method as it enables consistent heat transfer by presenting relatively uniform pieces to the subsequent cooking step while minimizing the exposure of free starch that would be vulnerable to excessive gelatinization and therefore could result in excessive stickiness that makes the dough more difficult to handle and form reproducibly into a food slice. Similar equipment can also be used to size reduce other vegetables for a cooking step. Amongst others, Lyco manufacture a range of rotary drum blanchers, BMA and ABCO supply steam based heat and hold systems capable of cooking either potato or vegetable material. Cooking times are well established by equipment fabricators and vary according to piece size, raw material variety, solids and desired cooked texture but are typically of the order of 10 to 20 minutes at around 90 C to 100 C and preferably around 15 to 20 mins at 95 C to 99 C for the 25 mm slabs of potato described here. In one preferred embodiment, the potatoes used for the vegetable chip or another dough based food slice contain a starch solids content of 18% to 28% and more preferably starch solids in the range 21% to 24%. The frozen potato and potato specialty industries utilize equipment such as Alimetec's Hoegger Separator to make smooth dough from raw materials, but especially potato, cooked in this manner. Conventional snack food slice preparation equipment, for example a masa sheeter and cutter, can be used to form and deposit shapes from the dough. Alternatively, the principles taught by U.S. Pat. No. 4,212,609 whereby a uniform air pressure ejects food material from a porous mould on a rotating drum can be adapted to the food slice forming for this invention. In a preferred embodiment a uniquely shallow mould of around 1 mm to 4 mm depth and preferably 1.5 mm to 2.5 mm is designed specifically for food slice forming and deposition onto a moving belt. The shape of an individual mould may vary in comparison to adjacent moulds in order to produce different shapes, for example by changing the circumferences or planes of the mould. Therefore, one important benefit that improves the natural appearance of the chip is the ability to deposit free form shapes without the need for tessellation of the shapes, which requires straight edges to the chip that can look unnatural in the finished chip, or recirculation of the fragile dough, which is required with current non-tessellated commercial snack forming methods. In addition, multiple and different shapes may be deposited from the same machine almost simultaneously.

Recently, Stork Food Systems have introduced their Revo Fomer (patent application WO 2004/002229), which operates on the principle of forming various food patties from meat, fish or potato in rotating porous moulds and then expelling the food patties with uniformly distributed forced air. This equipment offers an alternative to conventional food slice sheeting systems, for example masa sheeters used in the production of corn chips, since the moulds of the Revo Former can be adapted to form and deposit thin food slices in different shapes as described above in an efficient, high speed and sanitary manner suitable for use at commercial production rates in this invention. In addition to the advantages of air eject systems above, because the food slices are uniquely expelled from a mould and do not need to be cut from the dough, this forming method is able to handle real food recipes, which may contain fibrous or stringy ingredients, for example vegetables, legumes pulses or whole grains including husk, that would typically contaminate a traditional snacks forming, cutting and depositing operation.

By way of example, the food slices may be 1 mm up to 4 mm thickness, but preferably 1.5 mm to 2.5 mm in thickness, and comprise freshly cooked dough made from, for example, corn, corn and other grains or whole grains, potato or potato and other vegetables or pulses. One advantage of this forming system compared to the prior art is to shape and deposit uniform food slices from a dough made from real, whole food, fresh ingredients, that result in the nature of the dough ranging from fragile and non-cohesive to relatively soft and sticky with a tendency to or deform under its own weight. The air-eject forming system preferred for this invention ensures uniform deposition of the dough as a food slice regardless of the high native moisture content, relatively low binding starch content and absence of dough tenderizing, emulsifying or other artificial ingredients known to those skilled in the art. Moisture contents may be 65% or greater on a wet basis, for example 78% to 82% for a potato based dough or from 65% to 85% but preferably from 70% to 80% with a potato and other vegetable based dough. Therefore, in a departure from prior art, for example United States Patent 2006/0188639 or United States Patent 2005/0202142, the processing method disclosed is not dependant on preparing dough with the specific properties typically associated with snacks manufacturing and can form and dry food slices from doughs comprising 100% fresh, non-artificial materials, without the need to add dough binding ingredients, moisture binding ingredients, degumming agents, dry solids, starches, granules, lecithin or any other ingredient which some consumers or nutritionists may prefer to avoid in food products. Neither is it necessary to fragment and recombine the dough as a laminate or cluster. Therefore, this method of forming and depositing enables snack foods, but particularly vegetable chips from real vegetables, to be manufactured and labeled with a clean ingredient declaration.

Furthermore, the non-fried method disclosed for drying the food slice can manufacture vegetable chips at commercial line throughputs comparable to large snacks manufacturing lines today without the need to fry, the most popular and highly efficient method of drying fresh, high moisture raw materials for snacks today.

Using the air eject method, as embodied by the Revo Former, to deposit food slices in a uniform manner onto a moving belt, which enters a linear explosive drying step, is an effective method of enabling the use of high intensity, explosive microwave drying at commercial throughputs. As discussed previously, randomly presented food slices, for example from an Urshcell CC slicer, result in poor efficiency in both the throughput and the footprint occupied by a linear, belted explosive drying step since, to minimize fire risk and avoid product pieces welding together, it is necessary to maintain separation between food slices, which in turn introduces complex technology challenges to space the slices to an extent that reduces the energy transfer efficiency during explosive microwave drying.

When the processor wishes to incorporate oil or an optional medley of other ingredients to enhance the flavour experience or nutritional benefit of the food slice a simple mixing step can be included prior to forming. The Hobart Legacy is one example of a suitable mixer of the bowl and beater paddle type commonly used in the bakery industry Other examples are the vertical Brook Foods Record Planetary mixer or a horizontal Winkworth continuous ribbon mixer. However many industrial solutions to mixing on a batch or continuous basis are readily available according to the number and type of the ingredients in use and the processor must account for the preferred preparation method of each ingredient, for example grating, grinding, fine chopping or shredding and important food manufacturing standards, for example hygiene, associated with processing high moisture dough. In the embodiment of a vegetable chip recipe described above, the mixer will combine the potato, other vegetables, oil and ingredients in a time interval typically from between 10 seconds to 120 seconds but preferably around 30 seconds. The vegetables introduced to the mixer via the potato-cooking unit or a separate cooking unit with the oil and other ingredients added separately.

In a preferred embodiment and to improve the creativity of the recipe and enhance the food flavours of the final chip, vegetables other than potato may be prepared individually or may in whole or part be combined and prepared using any of a number of culinary preparation methods in a single or sequential series of steps. Equipment that enables a food processor to prepare chopped, diced or slabbed vegetables for use in the dough described and to replicate the culinary preparation steps, commonly found in cookery books and used in a kitchen by a chef, is known from the prepared food categories for fillings and sauces, for example the Stephan Universal Machine. The Universal Machine is not known for use in snack food manufacturing and therefore has new application in the disclosure provided here. The Universal Machine is suitable for a preferred Soffritto embodiment to generate authentic culinary flavours from the recipe in one step, for example by sautéing onion and other aromatic ingredients followed by cooking carrot, parsnip, broccoli or other vegetables to prepare a vegetable recipe without potato. The Universal Machine conveys additional benefits to the vegetable chip process efficiency and control. For example, efficiently simulating Brunoise preparation, a further size reduction of the vegetables and ingredients from diced chunks to small shreds that will remain visible and distinguishable pieces in the final chip and are suitable for inclusion in the dough. Another efficiency advantage may be realized by pressure cooking the vegetable recipe in the Universal Machine to enable more rapid cooking cycles. A further use of the Universal Machine benefits process consistency by reducing the moisture content of the prepared vegetables and ingredients to a consistent level prior to mixing with the potato portion of the dough via a reduction of pressure at the end of the cooking cycle to allow a portion of water to evaporate at pressure below 200 mbar or preferably between 70 mbar and 100 mbar using residual heat energy. The moisture content of the prepared vegetable mix may be reduced from, for example 85% to 65% but preferably to between 70% and 75% water content while under vacuum with no additional heat input. Therefore, the processor has a dough moisture control step that alleviates the load on subsequent drying steps and that eliminates complications that may occur when forming and depositing if the food slice moisture is excessively high, causing synerisis or product draping into the transport belt. The prepared vegetable recipe with culinary ingredients can be mixed with potato and oil to form the recipes disclosed below. Alternatively, after moisture reduction the vegetable recipe can be formed and deposited directly. In this latter case the vegetable chip should be deposited onto a transport belt with a weave that minimizes product drape or collapse. The addition of pulses, legumes, rice flour, gram flour or another binding ingredient may be desirable in the embodiment of this non-potato recipe for ease of processing.

In a preferred embodiment of this invention, a food slice prepared in this way will be transferred directly to a linear belt microwave for explosive drying. No other treatment or preparation steps are necessary using the disclosures of this invention. Several suitable belt types, made from for example polypropylene, polyethylene or PTFE coated fiberglass, are available from microwave oven manufacturers to transport the food slices in this application.

In one embodiment, the vegetable food slice is rapidly dried to a moisture content around 15% to 25%, close to the final glass transition point when potato is present, in under 90 seconds. In a preferred embodiment the dough slice is dried to the same moisture level in 15 seconds to 60 seconds and more preferably the vegetable food slice is dried to moisture content at or below 25% in 25 seconds to 35 seconds. At this stage, drying may continue in the same microwave chamber to a moisture content between 18% to 5% but preferably to between 12% to 8%. An example of the drying rate curve for a vegetable chip product is provided in FIG. 10.

Figure 10:
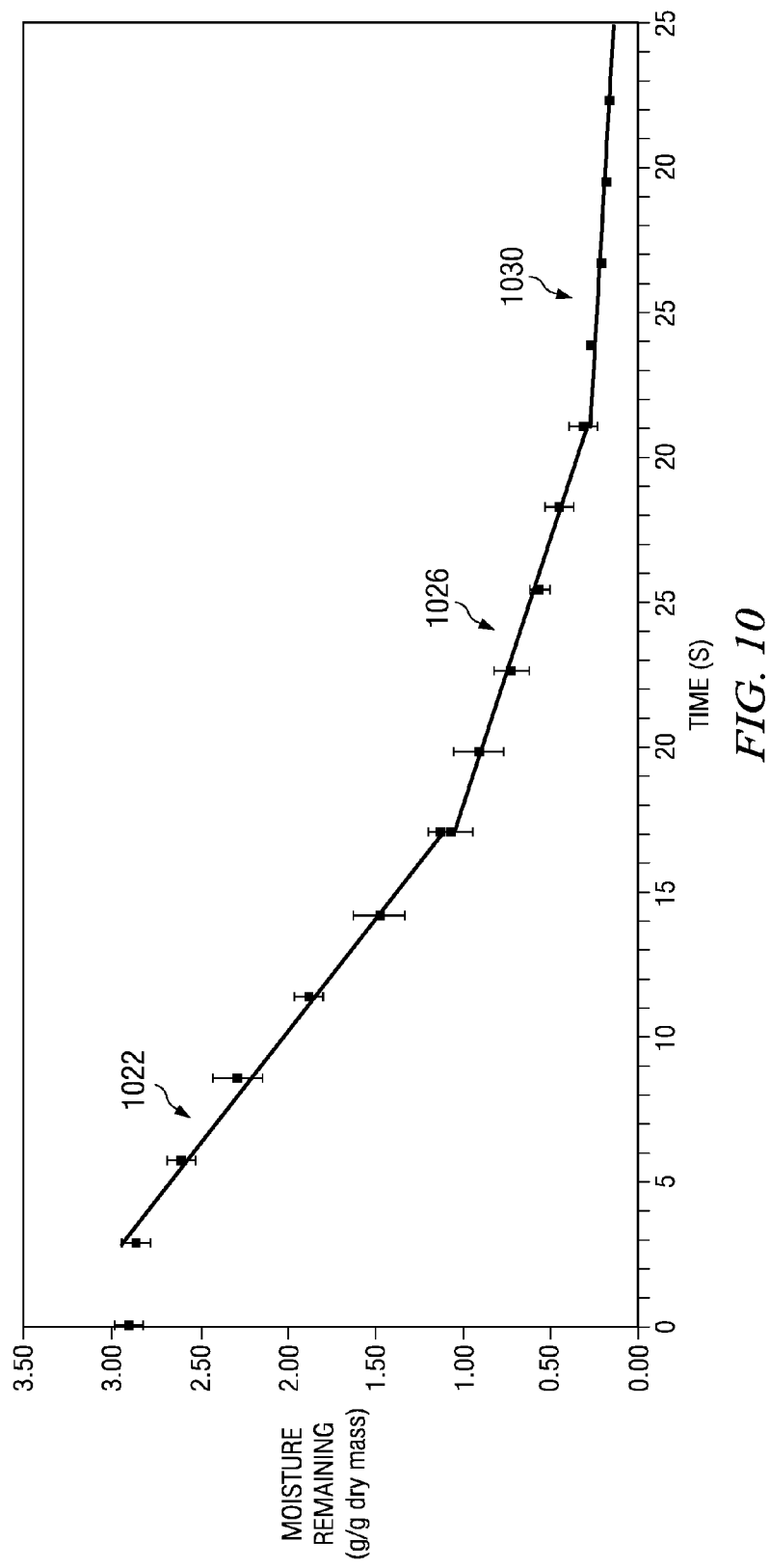
FIG. 10 is a graphical representation of the dehydration profile of a plurality of vegetable slices in accordance with one embodiment of the present invention.

FIG. 10 is a graphical representation of the dehydration rate of a plurality of vegetable food slices in accordance with one embodiment of the present invention. As shown in FIG. 10, there are three distinct drying phases that have a high linear correlation. the first phase dehydration rate 1022 is about 0.13 grams moisture per gram of solid per second, the second phase dehydration rate 1026 is about 0.05 grams moisture per gram of solid per second, and the third phase 1030 comprises a dehydration rate of about 0.01 grams water per gram of solid per second.

The exit moisture will in part depend on the ingredients of the composite food slice being processed. In one embodiment, food slices that continue to be dried by microwave cooking are transferred to a separate zone in the microwave chamber or to a separate microwave cavity when the moisture content is around 25%. A separate microwave cavity may be of the linear belted form or rotary form. The power is then independently controlled to reduce moisture content to somewhere in the range of 18% to 3% but preferably in the range of 12% to 8% moisture before entering a conventional hot air oven to reach the final shelf stable, snackable moisture content around 2%. In an alternative embodiment drying from around 25% moisture to 2% is completed in a hot air, multi-zone oven as for conventional snack foods. In one embodiment, slices are final dried in a hot air oven at between 110 C to 130 C until shelf stable moisture of around 2% is achieved. As discussed earlier, the initial rapid drying is a unique method for simulating the fried texture of, for example potato chips, for non-fried food slices made from fresh, real ingredients and the subsequent slower drying at lower moisture contents ensures desirable flavour and controllable colour development. The exact choice of temperature and process conditions for the final drying stages will depend in part on the food slice recipe in use and the level of temperature sensitive food chemistry reactions, for example maillard browning, that occur due to the ingredients present. In the embodiment of a vegetable chip, formed from a dough, comprising primarily potato or potato and other vegetables, into a food slice of 1 mm to 4 mm, but preferably 1.5 mm to 2.5 mm deep pieces with a moisture content of 65% to 85% but preferably 70% to 80% the drying rates are disclosed below.

TABLE 3

Drying Rates by phase for potato based food slices formed from dough suitable for vegetable chip manufacture: rates given are gram of moisture removed per gram of dry matter (dry basis)

|  | Minimum | Preferred Range | Maximum |
| --- | --- | --- | --- |
| Phase 1 | 0.04 | 0.06-0.18 | 0.20 |
| Phase 2 | 0.01 | 0.03-0.06 | 0.08 |
| Phase 3 | 0.0005 | 0.002-0.02 | 0.03 |

The preferred drying rates for this invention are particularly rapid and the total explosive drying time for a vegetable chip made with this process is typically between 30 and 60 seconds in which time the moisture content may be reduced to between 3% to 18% but preferably between 8% and 12% with a consistency that avoids excessive browning or scorching of individual chips. The drying may happen in a single linear dryer or in multiple linear dryers. The rapid drying assists with the generation of a desirable, crisp snacks texture without the formation of large bubbles in the chips that can lead to a fragile and broken finished product.

The duration of phase 1 will depend on the exact quantity of starting moisture in the dough and may be indistinguishable from phase 2, depending on the quantity of vegetable ingredients other than potato which are used in the recipe. As discussed earlier, Phase 2 represents a significant carbohydrate transition, which occurs from around 50% average moisture content to around 25% average moisture content and is thought to be related to starch transitions in a potato based food slice. For a potato slice with the applicants preferred texture, the Phase 2 period is between about 5 seconds and about 50 seconds or preferably between about 10 seconds and about 30 seconds. Those skilled in the art will appreciate that the drying times disclosed are extremely rapid compared to conventional non-frying technologies. Therefore, a fundamental advantage of this invention versus other heating methods is high capacity manufacturing of non-fried snacks. Thus, this invention overcomes the limitations on profitable, commercial manufacture of non-fried snacks. This limiting barrier occurs due to the fresh starting material that, while conveying benefits to the finished consumer product, requires large volumes of water to be removed. The limiting barrier is particularly increased due to the light piece weight of food slices that are suitable for snacking, especially when in the form of a chip that yields low product weight per area of transport belt. The limiting barrier is further increased when the light weight food slice comprises a dough where the properties are such that individual pieces must maintain their singulation, for example in a mono layered bakery line configuration, to avoid sticking, clumping or other shape defects. Thus, in an unfavourable difference compared to sweet or bread baking lines, a non-fried snacks line that produces thin, bite size pieces where the weight of 10 dried pieces may range from just 7 g to 15 g or preferably 8 g to 12 g, will have to dry product at low piece density, for example 1 kilogram per square metre of wet food slices. These limitations, particularly when occurring in combination, drive large dimensions, energy inefficiency and low throughput snack manufacturing lines when utilizing prior art or conventional non-fried drying technology, for example impingement ovens. By way of example of the magnitude of this benefit, the applicants estimate that preparation of a snack food from a food slice comprising 75% native moisture content requires the removal of up to 9 times more water than a conventional baked snack product. The application of the technology solutions disclosed ensures this requirement can be achieved with a drying train similar in size to conventional snack food manufacturing lines today.

The processor may elect to use conventional snacks seasoning equipment, to apply an optional dusting of topical salt or oil.

By way of example, and by no means limitation, real food recipes suitable for the food slices described, particularly the vegetable chip embodiment, and that can be processed into consumer-optimized snacks with crisp-like texture by drying to approximately 2% moisture are:

Example 1 (by wet dough mix weight): 85% potato, 12% legumes, for example chickpea, 3% oil, 0.1% coriander leaf, 0.1% whole cumin; which is equivalent to a finished chip of 72% potato, 16% chickpea, 11% oil, 0.5% coriander leaf, 0.5% cumin by weight;

Example 2 (by wet dough mix weight): 49% potato, 46% lentils, for example Chana Dhal lentils, 4% oil, 1% herbs and spices to season, for example selected from chili, garlic, cumin or turmeric; which is equivalent to a finished chip weight of 33% potato, 53% lentil, 13% oil, 1% herbs and spices.

Example 3 (by wet dough mix weight): 70% potato, 25% mixed root vegetables selected from, for example, carrot, parsnip and swede, 3% oil, 1.5% onions and 0.5% mixture of black pepper and herbs, for example selected from thyme, rosemary or tarragon to season; which is equivalent to a finished chip weight of 67% potato, 13% root vegetables, 16% oil, 3% onion, and 0.5% mixture of black pepper and herbs.

Example 4: 70% potato, 25% cauliflower or other brassica, 3% oil, 1.5% onions, 0.2% ginger, 0.2% garlic; 0.1% turmeric; which is equivalent to a finished chip weight of 67% potato; 13% cauliflower, 16% oil, 3% onion, 0.5% ginger, 0.4% garlic and 0.1% turmeric.

Those skilled in the art will recognize that a range of novel, tasty and nutritionally balanced vegetable chips that are diverse in both their recipe combinations and ingredient levels, can be prepared using the examples above. Therefore, this disclosure enables a novel baked vegetable chip to be made that combines a plurality of real, natural vegetables and is flavored with natural food ingredients that retain their authentic real food taste in the finished chip. This invention is not limited to slices of a single vegetable, which offer little choice in taste and flavour to consumers, but has the advantage of blending the nutrition of vegetables with creative culinary recipes to greatly enhance the taste and food experience. In addition, a surprising discovery for the inventors is the low salt level that is required for optimum taste of this culinary vegetable chip. The continuum of base recipes may range from 100% potato to 100% other vegetables, pulses legumes or whole grains. However, the preferred embodiment of a vegetable chip comprises recipes where finished ingredient compositions are in the range: potato 30% to 70%; Oil 5% to 30% and preferably 8% to 25% and more preferably 13% to 18%; vegetables or pulses 10% to 55% and preferably 15% to 30%; culinary prepared ingredients for example sautéed onion, leek or garlic, 0% to 5%; herbs, spices or seeds 0.5% to 2% and topical salt 0% to 1.0% but preferably 0.2% to 0.4%.

There are several product advantages provided by the present invention when used with dough based food slices to make vegetable chips. First, the process allows the nutritional profile of the product to be controlled. Therefore, the resulting products can be designed to meet the positive nutritional goals emerging in developed snacks markets today. For example, the vegetable chip embodiment described is capable of meeting the 'healthy' criteria of three or less and the 'more healthy' of zero or less when measured by the Nutrient Profile Score proposed by the UK Food Standards Agency. In addition, the product designer, chef or other recipe creator can flexibly design a product from a plethora of natural ingredients to be both tasty and healthy by balancing choice and level of ingredients with population nutrition standards. For example, to meet Guideline Daily Amounts (GDA's) commonly in use in the food industry of the European Union today or to ensure no 'Red' signals occur on the Traffic Light system in use in the EU and UK today. Therefore this invention enables products to be designed not only to culinary recipes but also to target nutritional criteria in line with national population goals. For example, maintaining the macro nutrient contents per 100 g of finished chip for fat at <20 g, saturated fat <5 g, Salt <1.5 g and sugar <22.5 g ensures that the macro nutrients present in the snack food comply to preferred nutrition criteria defined by the UK Food Standards Agency. This is a significant accomplishment in the convenient food and snacks world, which benefits both the manufacturer, since there are no 'high' or 'red traffic light' indicators required on pack and the consumer since the snack is nutritionally balanced and the snack experience is not compromised on taste. In one embodiment of the vegetable chip the recipe delivers the nutrition profile to have fat <16 g, saturated fat <1.5 g, salt <1 g and sugar <10 g; and in another embodiment the vegetable chip recipe is designed to have fat <16 g, saturated fat <1.5 g, salt <0.3 g and sugar <5 g, where salt (sodium) and sugar are naturally present in the ingredients and not introduced by the product designer.

As part of positive nutritional design, oil is added in controlled amounts either before and/or after the primary drying step. One advantage of adding oil before the explosive dehydration is that it will be heated for a short period toward the end of the explosive drying and this develops desirable fried-flavor characteristics that are not developed with conventional baking or impingement ovens.

Another advantage provided by the present invention is the processing temperatures. Because the processing temperatures are relatively low throughout the food slice (e.g. can be maintained at about 100° C. even on the outer skin) when compared to conventional hot oil frying, and the processing times are relatively short, e.g. less than about 60 seconds is achievable even for high moisture doughs, less of the inherent nutrition is expected to be destroyed during the drying process and natural flavor characteristics of the substrate or added ingredients derived from nuts, seeds, pulses, herbs, spices etc. are retained. Similarly, nutritionally desirable vitamins, essential fatty acids or phytonutrients inherent in the added ingredients or directly added for fortification are expected to be retained. Further, the low temperature and short drying time benefits the use of natural ingredients if added as flavorings or seasonings in dough-based embodiments. By definition, natural ingredients have originated from nature without undue processing and occur in forms that are readily recognizable as the original ingredient through, for example appearance, colour, flavour or texture even after preparation for storage, which may include washing, blanching, smoking, dicing, freezing or storage in oil as examples. Natural ingredients can be incorporated into a food slice dough, to be visible and recognizable in the snack foods manufactured with the applicants disclosure, but are not typically suitable for topical coating of snacks foods due to their relatively large size and irregular shape. By contrast, ingredients that have been processed or homogenized in form, for example powder, granulated or flaked and are no longer recognizable from the original starting material would be considered artificial and are typically used in topical coatings today.

When incorporated into food slice recipes natural ingredients substantially retain their fresh appearance due to the relatively low drying temperatures of this invention. By way of example only, fresh mint or coriander leaf in the dough will appear much more fresh, green and whole than when processed by a hot air oven which causes a degradation to appearance since the leaf becomes dark green and shriveled by the heat. This drying method and profile also helps to ensure that any natural ingredients added can deliver an authentic, vibrant flavor to a finished product because the natural ingredients added for reasons of flavor, texture or fortification, can be expected to retain a significant portion of their inherent nutritional and organoleptic value without losing desirable aroma, flavor, color or phytonutrient compounds. Consequently, a significant advantage of the dough based food slices illustrated is to produce a snack where the flavour is derived entirely from the natural ingredients, for example vegetables, herbs and spices, in the dough base. In this case, the snack does not require topical, powder seasoning that is typically used on snack foods today. Therefore, the snack does not require powder, flake, granule or any artificial ingredient to be incorporated in the dough of the food slice or as a coating to the snack chip to deliver a consumer optimized flavour. The absence of topical powders ensures the snack is substantially clean on the fingers when eaten, thus avoiding a common consumer complaint of conventional snack foods. Furthermore, one important benefit of the ability to make snack foods using natural ingredients is the relatively low sodium level required for a consumer-optimized flavour. Typically, topically applied salt can be reduced to 25% to 50% of the level of potato crisps today or eliminated from the recipe while still delivering a palatable consumer optimized snack flavour.

In addition, the present invention provides a way to provide a balanced nutritional profile using real food ingredients, such as vegetables, nuts, seeds, herbs, and spices or cheese. Vegetables that can be used include, but are not limited to carrots, parsnip, sweet potato, turnip, squash, courgette, asparagus, mushroom, broccoli, cauliflower, sweet pepper, chili pepper, peas, sweet corn, artichoke, celeriac, tomato, olives, aubergine, beetroot, fennel, onions, spinach, chard and cabbage. Nuts that can be used include, but are not limited to almonds, peanuts, walnuts, pecans, and Brazils. Seeds that can be used include, but are not limited to pumpkin, sunflower, sesame, mustard, fennel, poppy, and squash. Pulses and legumes that can be used include but are not limited to peas, chickpeas, lentils, pinto beans, kidney beans, broad beans, butter beans, soy beans, runner beans or black eye beans. Cereals that can be used include but are not limited to oats, wheat, sorghum, rice, millet, rye, and barley. Herbs and spices that can be used include but are not limited to basil, bay leaves, coriander, mint, cumin, cardamom, cloves, cinnamon, tarragon, dill, marjoram, garlic, lemongrass, oregano, paprika, turmeric, parsley, and pepper, just to name a few. Natural oil extracts, infused or seasoned oils can also be used either prior to or post primary drying by mixing into the dough or applying topically.

Advantageously, because the real food ingredients can be added after any blanching, thermal pre-conditioning or lipophilic preconditioning step, and because of the relatively lower temperatures and short dwell time during dehydration, the flavor profiles are more similar to the natural counterparts and more pronounced than prior art snacks that are cooked in high temperature ovens or fryers. Further, because there is no oil or water medium, the nutrient content and flavor compounds do not leach out of the food slice so are available to be enjoyed in the final chip. Consequently, unlike the prior art, the present invention provides a way to formulate natural flavor profiles without the use of artificial ingredients.

While the invention has been particularly shown and described with reference to a preferred embodiment, it will be understood by those skilled in the art that various changes and form of detail may be made therein without departing from the spirit and scope of the invention.

What is claimed is:

1. A method for preparing shelf-stable potato slices comprising the steps of:
   a) lipophilically preconditioning a plurality of potato slices in oil, wherein said lipophilic preconditioning is of 60 to 120 seconds in duration and wherein said potato slices are brought to a temperature of 75° C. to 99° C. during said lipophilic preconditioning;

b) explosively dehydrating said potato slices to a moisture content of less than about 20% with a microwave; and c) further dehydrating said slices in a non-oil medium to a moisture content of less than 3%.

2. The method of claim 1 wherein the potato slices are subjected to an oil removal step after the thermal preconditioning of step a) and before the dehydrating of step b).

3. The method of claim 1 wherein the potato slices are subjected to a pre-drying step in a microwave pre-dryer prior to the dehydrating of step b) in the microwave.

4. The method of claim 3 wherein said pre-drying creates an elastic slice that adopts a curl shape during the subsequent explosive dehydration.

5. The method of claim 3 wherein microwave pre-dryer comprises a linear belted oven on which the slices are spread.

6. The method of claim 3 wherein said pre-drying takes from 5 seconds to 90 seconds, optionally from 5 to 45 seconds, further optionally from 10 seconds to 20 seconds.

7. The method of claim 3 wherein at least one quarter of the water content of the potato slices, optionally from one quarter to one half of the water content of the potato slices, is removed during pre-drying.

8. The method of claim 1 wherein step b) simulates the dehydration profile with respect to moisture content and time of continuously fried potato chips and includes dehydrating from a moisture content of greater than 60% to a moisture content of less than 20% in less than 60 seconds.

9. The method of claim 1 wherein step b) comprises dehydrating to a moisture content of between 3% and 18%, optionally between 8% and 12%.

10. The method of claim 1 wherein step b) comprises microwave dehydrating said slices to a starch melting point range in less than 60 seconds and further microwave dehydrating said slices in a starch glass transition range in less than an additional 50 seconds, optionally dehydrating said slices to a starch melting point range in less than 40 seconds and further dehydrating said slices in a non-oil medium starch glass transition range in less than an additional 30 seconds.

11. The method of claim 1 wherein said non-oil medium at step c) comprises infrared radiation or hot air.

12. The method of claim 1 wherein the oil temperature of said lipophilic preconditioning of step a) is 85° C. to 95° C. and the duration of said lipophilic preconditioning is from 60 to 100 seconds.

13. The method of claim 1 wherein said explosive dehydration of step b) comprises a first dehydration rate and a second dehydration rate, optionally wherein said first dehydration rate is between 0.02 grams of moisture per gram of solid per second and 0.20 grams of moisture per gram of solid per second, further optionally between 0.06 grams of moisture per gram of solid per second and 0.18 grams of moisture per gram of solid per second, and/or wherein said second dehydration rate is between 0.004 grams of moisture per gram of solid per second and 0.08 grams of moisture per gram of solid per second, further optionally between 0.03 grams of moisture per gram of solid per second and 0.06 grams of moisture per gram of solid per second.

14. The method of claim 13 wherein said explosive dehydration of step b) further comprises a third dehydration rate of between 0.0005 grams of moisture per gram of solid per second and 0.03 grams of moisture per gram of solid per second, optionally between 0.002 grams of moisture per gram of solid per second and 0.02 grams of moisture per gram of solid per second.

15. The method of claim 1 wherein the step of explosively dehydrating takes place in a lined cavity, a lining of the cavity comprising a microwave-transparent material.

* * * * *